(12) United States Patent
Mizutani et al.

(10) Patent No.: US 8,773,444 B2
(45) Date of Patent: Jul. 8, 2014

(54) SIGNAL PROCESSING APPARATUS AND METHOD, AND PROGRAM

(75) Inventors: Tomoji Mizutani, Kanagawa (JP); Teruo Kajiura, Kanagawa (JP); Masato Noguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 140 days.

(21) Appl. No.: 13/215,944

(22) Filed: Aug. 23, 2011

(65) Prior Publication Data

US 2012/0050617 A1 Mar. 1, 2012

(30) Foreign Application Priority Data

Aug. 27, 2010 (JP) ................................ P2010-190385

(51) Int. Cl.
*G06F 15/00* (2006.01)
*G06T 1/00* (2006.01)

(52) U.S. Cl.
USPC ........................................................ 345/501

(58) Field of Classification Search
USPC ........................................................ 345/501
See application file for complete search history.

(56) References Cited

U.S. PATENT DOCUMENTS

2006/0290817 A1* 12/2006 Yui et al. ...................... 348/564
2009/0096929 A1* 4/2009 Silberstein ................... 348/659

FOREIGN PATENT DOCUMENTS

JP 2000-23033 1/2000

* cited by examiner

*Primary Examiner* — David Zarka
*Assistant Examiner* — Vu Nguyen
(74) *Attorney, Agent, or Firm* — Frommer Lawrence & Haug LLP; William S. Frommer

(57) ABSTRACT

A signal processing apparatus includes: an inputting section inputting plural video signals; a signal processing section subjecting the plural video signals; one or more sub-multi-screen split display signal generating sections selecting P (P: integral number of 2 or more) kinds of video signals from the plural video signals subjected to the signal processing, and intermediate generation signals as one or more video signals generated while the signal processing section subjects the plural video signals to the signal processing, and synthesizing the P kinds of video signals, thereby generating one or more sub-multiscreen split display signals; and a multiscreen split display signal generating section selecting Q (Q: integral number of 1 or more) kinds of sub-multiscreen split display signals from the one or more sub-multiscreen split display signals, and synthesizing the Q kinds of sub-multiscreen split display signals, thereby generating a multiscreen split display signal.

7 Claims, 15 Drawing Sheets

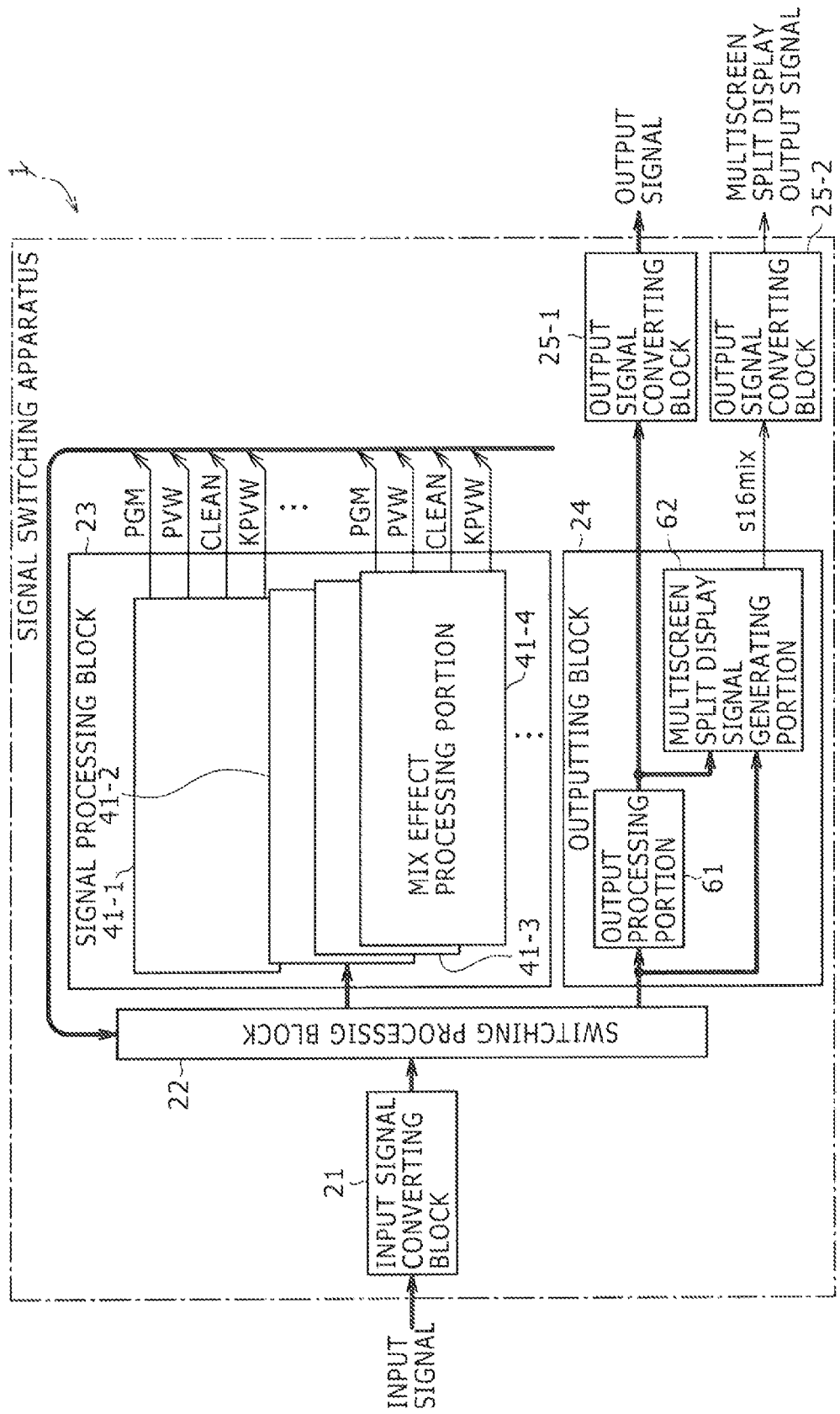

FIG. 3

|  |  |  |  |
|---|---|---|---|
| PGM #1 | PVW #1 | PGM #2 | PVW #2 |
| CLEAN #1 | KPVW #1 | CLEAN #2 | KPVW #2 |
| PGM #3 | PVW #3 | PGM #4 | PVW #4 |
| CLEAN #3 | KPVW #3 | CLEAN #4 | KPVW #4 | s16mix

FIG. 6

| PGM #1 | PVW #1 | PGM #2 | PVW #2 |
| CLEAN #1 | KPVW #1 | CLEAN #2 | KPVW #2 |
| PGM #3 | PVW #3 | PGM #4 | PVW #4 |
| CLEAN #3 | KPVW #3 | CLEAN #4 | KPVW #4 | s4mix1, s4mix2, s4mix3, s4mix4, s16mix

FIG. 15

|  | sL4mix | | sLKmix | |
|---|---|---|---|---|
| | PGM FOR LEFT EYE | PVW FOR LEFT EYE | PGM FOR RIGHT EYE | PVW FOR RIGHT EYE |
| | CLEAN FOR LEFT EYE | KPVW FOR LEFT EYE | CLEAN FOR RIGHT EYE | KPVW FOR RIGHT EYE |
| | KEY ADJUSTING SIGNAL key1 FOR LEFT EYE | KEY ADJUSTING SIGNAL key2 FOR LEFT EYE | KEY ADJUSTING SIGNAL key1 FOR RIGHT EYE | KEY ADJUSTING SIGNAL key2 FOR RIGHT EYE |
| | KEY ADJUSTING SIGNAL key3 FOR LEFT EYE | KEY ADJUSTING SIGNAL key4 FOR LEFT EYE | KEY ADJUSTING SIGNAL key3 FOR RIGHT EYE | KEY ADJUSTING SIGNAL key4 FOR RIGHT EYE | s3Dmix, sR4mix, sRKmix

SIGNAL PROCESSING APPARATUS AND METHOD, AND PROGRAM

BACKGROUND

The present disclosure relates to an apparatus and a method for signal processing, and program. In particularly, the disclosure relates to an apparatus and a method for signal processing in each of which even when the number of screen split display, and the number of internal signals, within a signal switching apparatus, enabling images corresponding thereto to be displayed on sub-screens, respectively, are both increased, multiscreen split display can be realized by suppressing an increase in circuit scale, and a program for use therein.

Heretofore, an apparatus for selectively switching signals as an object of output from plural signals which have been inputted or generated in the inside (hereinafter referred to as "a signal switching apparatus") has been utilized in various kinds of fields. The signal switching apparatus, for example, is described in Japanese Patent Laid-Open No. 2000-23033.

For example, when a program is produced by either a broadcasting station or a program production office, in order that a producer who produces the program may either edit or confirm an image, the signal switching apparatus is used. It is noted that such a signal switching apparatus will be especially hereinafter referred to as "the signal switching apparatus for program production." That is to say, the signal switching apparatus for program production selectively switches plural video signals as an object of output from plural video signals such as an inputted video signal, a video signal edited with either an auto-apparatus or another apparatus, and various kinds of video signals generated during the edition (hereinafter referred to as "intermediate generation signals").

Heretofore, the signal switching apparatus for program production outputted plural video signals as an object of output to the outside with a form thereof being held as it is. That is to say, the existing broadcasting station or program production office dealt with plural video signals as the object of the output with the form thereof being held as it is. In recent years, however, along with the miniaturization of a program production system or the like, a request to deal with plural video signals based on which plural images corresponding to the plural video signals as an object of output, respectively, are collectively displayed on the same screen in a split screen manner has arisen from the broadcasting station and the program production office. Here, displaying collectively plural images on the same screen in the split screen manner will be hereinafter referred to as "multiscreen split display." In addition, the video signal with which the multiscreen split display is realized will be hereinafter referred to as "a multiscreen split display signal." Then, it is desirable to provide a signal switching apparatus for program production including a function of outputting the multiscreen split display signal.

Here, the screen means an entire display area of either a display section or a display device which an apparatus has. Of the entire screen on which the multiscreen split display is carried out, that is, of the entire display area, partial display areas on which plural images are displayed, respectively, will be hereinafter "sub-screens." That is to say, in the multiscreen split display, one screen is partitioned into plural sub-screens on which plural images are displayed, respectively.

Specifically, for example, when the multiscreen split display is carried out in the process of production of the program, the screen is partitioned into plural sub-screens on which all of images necessary for a confirmation work made by an editor are displayed, respectively. That is to say, the signal switching apparatus for the program production suitably switches plural video signals as an object of such multiscreen split display from plural video signals, generates the multiscreen split display signal in accordance with the plural video signals thus switched, and outputs the multiscreen split display signal thus generated.

SUMMARY

However, although there exists the desire to increase the total number of sub-screens (hereinafter referred to as "the number of screen split display" as well), or the total number of original video signals which are selectively switched, thereby carrying out the multiscreen split display, it may be impossible for the existing signal switching apparatus for the program production to sufficiently respond to the desire concerned. The reason for this is because the number of signals, and the circuit scale for realizing the multiscreen split display are both increased, which is not realistic. Hereinafter, this will be concretely desired with reference to FIG. 1.

[Existing Signal Switching Apparatus]

FIG. 1 is a block diagram showing an example of a configuration of an existing signal switching apparatus 1 for program production.

As shown in FIG. 1, the existing signal switching apparatus 1 is composed of an input signal converting block 21, a switching processing block 22, a signal processing block 23, an outputting block 24, an output signal converting block 25-1, and an output signal converting block 25-2.

The input signal converting block 21 converts a video signal inputted thereto from the outside into a signal having a form capable of being dealt with in the apparatus of the signal switching apparatus 1 (hereinafter referred to as "an intra-apparatus signal"), and outputs the resulting signal to the switching processing block 22.

The switching processing block 22 selectively switches either the intra-apparatus signal inputted thereto from the input signal converting block 21, or the intra-apparatus signal re-inputted thereto from the signal processing block 23, and outputs the intra-apparatus signal thus selectively switched to a predetermined output destination. In the example shown in FIG. 1, the signal processing block 23 and the outputting block 24 are given as the output destination. That is to say, the intra-apparatus signal outputted from the switching processing block 22 is outputted either to the signal processing block 23 or to the outputting block 24.

The signal processing block 23 subjects various kinds of signal processing to the intra-apparatus signal inputted thereto from the switching processing block 22. The intra-apparatus signal which has been subjected to the various kinds of signal processing is outputted from the signal processing block 23 to be re-inputted to the switching processing block 22. It is noted that a series of processing for subjecting the intra-apparatus signal inputted from the switching processing block 22 to the signal processing block 23 to the signal processing in the signal processing block 23, and re-inputting the resulting intra-apparatus signal to the switching processing block 22 is continuously executed plural times in some cases.

The signal processing block 23 is configured so as to include mix effect processing portions 41-1 to 41-4 in order to execute such various kinds of signal processing.

It should be noted that although in FIG. 1, only the mix effect processing portions 41-1 to 41-4 are illustrated in the signal processing block 23, various kinds of constituent elements for executing other various kinds of signal processing may exist in the signal processing block 23. For example, the constituent elements such as a frame memory, a special effect processing portion for executing special effect processing such as mosaic processing, and a three-dimensional effect processing portion for executing effect processing for converting a two-dimensional image into a three-dimensional image are suitably provided in the signal processing block 23.

It is noted that when there is no need for individually distinguishing the mix effect processing portions 41-1 to 41-4 from one another, the mix effect processing portions 41-1 to 41-4 will be hereinafter collectively referred to as "the mix effect processing portion 41."

The mix effect processing portion 41 executes signal processing for mixing two or more images based on the intra-apparatus signal inputted thereto from the switching processing block 22, and adding various kinds of effects such as wipe switching processing and key processing to the images and mixing the resulting video signals with one another (hereinafter referred to as "mix effect processing"). While the mix effect processing portion 41 executes the mix effect processing, plural intermediate generation signals are generated. Also, the mix effect processing portion 41 outputs the video signal having the final form for which all of the mix effect processing has been executed together with the plural intermediate generation signals thus generated.

[Signals Outputted from Mix Effect Processing Portion 41]

FIGS. 2A to 2D are respectively diagrams explaining examples of the video signals outputted from the mix effect processing portion 41 in such a way.

In the example shown in FIGS. 2A to 2D, respectively, the video signals corresponding to: Program (PGM); Preview (PVW); CLEAN; and Key Preview (KPVW) are outputted from the mix effect processing portion 41.

That is to say, the mix effect processing portion 41 deals with an image for which one or more objects are selectively superimposed on one another while a scene is switched to another one as an image of a program which will be finally broadcasted. In this case, the mix effect processing portion 41 subjects the video signals of two scenes to the mix effect processing.

Processing for gradually switching the scene to the other by spending predetermined time while two scenes before and after the switching are partitioned and synthesized with each other is referred to as the wipe switching processing. The image after such wipe switching processing has been executed is referred to as the image CLEAN. In addition, processing for cutting out and synthesizing one or more objects selected from plural objects into an image is referred to as key processing. Also, an image obtained when all of the objects as an object of selection in the key processing are cut out and synthesized into the image CLEAM is referred to as the image KPVW.

However, as described above, the image of the program which will be finally broadcasted is an image in which not all of the objects, but one or more objects selected in the key processing (eventually, there may also be the case where all of the objects are selected in the key processing) are cut out and synthesized into the image CLEAN. Of such a program which will be finally broadcasted, the video signals for a given period of time, for example, the video signals for a period of time for the wipe switching processing are generated from the mix effect processing portion 41 approximately for the same period. Of the images of the program corresponding to the video signals generated by the mix effect processing portion 41 in such a way, the image as an object of the display is referred to as the image PGW, and the next image after completion of the wipe switching processing is referred to as the image PVW.

In the example shown in FIG. 1, each of the four mix effect processing portions 41-1 to 41-4 outputs the video signals about PGM, PVM, CLEAN, and KPVW, that is, the four kinds of video signals, and re-inputs the four kinds of video signals to the switching processing block 22. That is to say, when the four kinds of video signals are treated as one set, four sets of video signals are outputted from the four mix effect processing portions 41-1 to 41-4, respectively. Therefore, as a whole, the 16 kinds of video signals in total are outputted from the four mix effect processing portions 41-1 to 41-4 to be re-inputted to the switching processing block 22.

The 16 kinds of video signals re-inputted to the switching processing block 22 in such a way are outputted to the outputting block 24. In this case, the outputting block 24 subjects the 16 kinds of video signals inputted thereto from the switching processing block 22 to various kinds of signal processing, and outputs the resulting video signals to the output signal converting portions 25-1 and 25-2.

The outputting block 24 is composed of an output processing portion 61 and a multiscreen split display signal generating portion 62 in order to execute such various kinds of signal processing.

It is noted that the video signals inputted from the switching processing block 22 to the outputting block 24 are especially by no means limited to the 16 kinds of video signals described above. Thus, the video signals inputted from the switching processing block 22 to the outputting block 24 may be an arbitrary number and arbitrary kinds of video signals of the concerned 16 kinds and different kinds of video signals. However, for the sake of convenience of a description, the following description will be given on the assumption that either the 16 kinds of video signals described above, or one kind of video signal after completion of the edition (corresponding to the video signal PGM) is inputted to the outputting block 24. In this case, it is supposed that the 16 kinds of video signals described above are used in generation of the multiscreen split display signal, and one kind of video signal after completion of the edition is used as the video signal for the final program broadcasting. Then, hereinafter, the 16 kinds of video signals described above will be referred to as a video signal group for multiscreen split display generation, and one kind of video signal after completion of the edition will be referred to as a post-edition video signal.

After the outputting processing portion 61 suitably subjects the post-edition video signal inputted thereto from the switching processing block 22 to output processing, the outputting processing portion 61 outputs the resulting post-edition video signal to the output signal converting block 25-1. In addition, after the outputting processing portion 61 suitably subjects the video signal group for the multiscreen split display generation to the output processing, the outputting processing portion 61 outputs the resulting video signal group for the multiscreen split display generation to the multiscreen split display signal generating portion 62.

The output signal converting block 25-1 converts the post-edition video signal outputted thereto from the output processing portion 61 from a form of the intra-apparatus signal into a form of the intra-apparatus signal which can be dealt with by a display device or the like (not shown), and outputs the resulting post-edition video signal having such a form to the display device or the like (not shown). As a result, as described above, an image corresponding to the post-edition video signal is displayed on the display device or the like (not shown).

The multiscreen split display signal generating portion 62 selectively switches the video signals corresponding to the number of split display in the multiscreen split display, that is, the number of sub-screens from the video signal group for the multiscreen split display generation inputted thereto either from the switching processing block 22 or the output processing portion 61. An arbitrary number can be set as the number of split display in this case. Also, the multiscreen split display signal generating portion 62 synthesizes the video signals with one another in such a way that the images corresponding to the video signals thus selected, respectively, can be displayed on the respective sub-screens in a split screen manner to generate the multiscreen split display signal, thereby outputting the multiscreen split display signal thus generated to the output signal converting block 25-2.

[Example of Multiscreen Split Display Signal]

FIG. 3 is a diagram showing an example of the multiscreen split display signal outputted from the multiscreen split display signal generating portion 62.

In the example shown in FIG. 3, the multiscreen split display signal generating portion 62 does not select a part of the video signal group for the multiscreen split display generation outputted thereto from the mix effect processing portions 41-1 to 41-4, that is, a part of the 16 kinds of video signals, but selects all of the 16 kinds of video signals. Also, the multiscreen split display signal generating portion 62 synthesizes all of the 16 kinds of video signals with one another, thereby generating a multiscreen split display signal s16mix. The multiscreen split display signal s16mix (more exactly, the video signal whose output form has been converted into another one by the output signal converting block 25-2), as shown in FIG. 3, means the video signal with which the multiscreen split display in which the 16 kinds of video signals are displayed on the respective sub-screens in the split screen manner is realized.

Characters within the respective sub-screens of FIG. 3 represent the kinds of images displayed on the respective sub-screens. "#K" displayed on the respective sub-screens corresponds to the final character "K" of the code in the mix effect processing portion 41-K. That is to say, of the images corresponding to the four kinds of video signals, respectively, outputted from the mix effect processing portion 41-K, the image having the kind illustrated within the sub-screen in which "#K" is illustrated is displayed within the sub-screen concerned.

Specifically, the images of PGM, PVW, CLEAN, and KPVW corresponding to the four kinds of video images, respectively, outputted from the mix effect processing portion 41-1 are displayed on the top-left side four sub-screens in each of which "#1" is illustrated. Likewise, the images of PGM, PVW, CLEAN, and KPVW corresponding to the four kinds of video images, respectively, outputted from the mix effect processing portion 41-2 are displayed on the top-right side four sub-screens in each of which "#2" is illustrated. The images of PGM, PVW, CLEAN, and KPVW corresponding to the four kinds of video images, respectively, outputted from the mix effect processing portion 41-3 are displayed on the bottom-left side four sub-screens in each of which "#3" is illustrated. Also, the images of PGM, PVW, CLEAN, and KPVW corresponding to the four kinds of video images, respectively, outputted from the mix effect processing portion 41-4 are displayed on the bottom-right side four sub-screens in each of which "#4" is illustrated.

The output signal converting block 25-2 converts the multiscreen split display signal s16mix outputted thereto from the multiscreen split display signal generating portion 62 from the form of the intra-apparatus signal into the form of the intra-apparatus signal which can be dealt with by the display device or the like (not shown), and outputs the resulting multiscreen split display signal s16mix to the display device or the like (not shown). As a result, as described above, 16-split picture shown in FIG. 3 is displayed on the display device or the like (not shown).

As has been described so far, the signal switching apparatus 1 shown in FIG. 1 realizes the multiscreen split display in which the number of screen split display (that is, the total number of sub-screens) is "16." For this reason, in the signal switching apparatus 1, the 16 kinds of video signals corresponding to the 16 sub-screens, respectively, are outputted as the video signal group for the multiscreen split display generation from the mix effect processing portions 41-1 to 41-4 to be re-inputted to the switching processing block 22. Therefore, 16 signal lines through which the 16 kinds of video signals are transmitted, respectively, are necessary for the signal processing block 23 having the mix effect processing portions 41-1 to 41-4.

In addition, although in the example described above, the number of signals in the video signal group for the multiscreen split display generation inputted to the multiscreen split display signal generating portion 62, and the number of signals selected within the multiscreen split display signal generating portion 62 agree as "16" with each other, they do not usually, necessarily agree with each other. That is to say, in general, the number of signals in the video signal group for the multiscreen split display generation inputted to the multiscreen split display signal generating portion 62 is larger than the number of signals selected within the multiscreen split display signal generating portion 62. Thus, only a part of the video signals within the video signal group for the multiscreen split display generation is selectively switched to be used in generation of the multiscreen split display signal.

More generally speaking, when the multiscreen split display in which the number of screen split display (that is, the total number of sub-screens) is M is realized, the M or more signal lines in the signal processing block 23 having the mix effect processing portions 41-1 to 41-4 are necessary for the signal switching apparatus 1.

In addition, although not illustrated in FIG. 1, when a function for other pieces of signal processing is necessary for the signal processing block 23, the number of signals is increased all the more because constituent elements for realizing the function concerned are necessary.

Therefore, in order to respond to the request described above, that is, the request to increase the number of multiscreen split display (that is, the total number of sub-screens) or the total number of original video signals which are selectively switched to carry out the multiscreen split display, with the existing signal processing apparatus, the number of internal signal lines is increased. In addition, a circuit for inputting/outputting the signals to/from a large number of signal lines, for example, a circuit with which the switching processing block 22, the signal processing block 23, the multiscreen split display signal generating portion 62, and the like are realized is also scaled up.

The number of mix effect processing portions 41 mounted represents the entire scale of the signal switching apparatus 1 in some cases. Thus, when the number of mix effect processing portions 41 mounted is K (K is an integral number of 1 or more), the scale of the signal switching apparatus 1 is expressed as K M/E. Since the four mix effect processing portions 41-1 to 41-4 are illustrated in the example shown in FIG. 1, the scale of the signal switching apparatus 1 is expressed as 4M/E.

The function and the reduced cost of the multiscreen split display signal generating portion 62 show a trade-off relationship. Therefore, heretofore, the multiscreen split display signal generating portion 62 is not built in the signal switching apparatus 1 having the large scale of 3M/E or more.

The present disclosure has been made in order to solve the problems described above, and it is therefore desirable to provide an apparatus and a method for signal processing in each of which even when the number of screen split display, and the number of internal signals in a signal switching apparatus enabling display on sub-screens are increased, multi-screen split display can be carried out with suppressing an increase in circuit scale, and a program for use therein.

In order to attain the desire described above, according to a mode of the present disclosure, there is provided a signal processing apparatus including: an inputting section configured to input plural video signals; a signal processing section configured to subject the plural video signals inputted to the inputting section to signal processing; one or more sub-multiscreen split display signal generating sections configured to select P (P: integral number of 2 or more) kinds of video signals from the plural video signals subjected to the signal processing by the signal processing section, and intermediate generation signals as one or more video signals generated while the signal processing section subjects the plural video signals to the signal processing, and synthesize the P kinds of video signals thus selected, thereby generating one or more sub-multiscreen split display signals; and a multiscreen split display signal generating section configured to select Q (Q: integral number of 1 or more) kinds of sub-multiscreen split display signals from the one or more sub-multiscreen split display signals generated by the one or more sub-multiscreen split display signal generating sections, and synthesize the Q kinds of sub-multiscreen split display signals thus selected, thereby generating a multiscreen split display signal.

According to another mode of the present disclosure, there is provided a signal processing method including: inputting plural video signals; subjecting the plural video signals inputted in the inputting processing to signal processing; selecting P (P: integral number of 2 or more) kinds of video signals from the plural video signals subjected to the signal processing in the processing of the signal processing, and intermediate generation signals as one or more video signals generated while the plural video signals are subjected to the signal processing in the processing of the signal processing, and synthesizing the P kinds of video signals thus selected, thereby generating one or more sub-multiscreen split display signals; and selecting Q (Q: integral number of 1 or more) kinds of sub-multiscreen split display signals from the one or more sub-multiscreen split display signals generated in the one or more pieces of sub-multiscreen split display signal generation processing, and synthesizing the Q kinds of sub-multiscreen split display signals thus selected, thereby generating a multiscreen split display signal.

According to still another mode of the present disclosure, there is provided a program causing a computer to execute control processing including: inputting plural video signals; subjecting the plural video signals thus inputted to signal processing; selecting P (P: integral number of 2 or more) kinds of video signals from the plural video signals subjected to the signal processing, and intermediate generation signals as one or more video signals generated while the plural video signals are subjected to the signal processing, and synthesizing the P kinds of video signals thus selected, thereby generating one or more sub-multiscreen split display signals; and selecting Q (Q: integral number of 1 or more) kinds of sub-multiscreen split display signals from the one or more sub-multiscreen split display signals generated, and synthesizing the Q kinds of sub-multiscreen split display signals thus selected, thereby generating a multiscreen split display signal.

In the signal processing apparatus according to the mode of the present disclosure, the signal processing method according to the another mode of the present disclosure, and the program according to the still another mode of the present disclosure, the plural video signals are inputted, and are subjected to the signal processing. The P (P: integral number of 2 or more) kinds of video signals are selected from the plural video signals subjected to the signal processing, and the intermediate signals as the one or more video signals generated while the plural video signals are subjected to the signal processing, and synthesized with one another, thereby generating the one or more sub-multiscreen split display signals. The Q (Q: integral number of 1 or more) kinds of sub-multiscreen split display signals are selected from the one or more sub-multiscreen split display signals thus generated, and synthesized with one another, thereby generating the multiscreen split display signal.

As set forth hereinabove, according to the present disclosure, even when the number of screen split display, and the number of internal signals in the signal switching apparatus enabling the display on the sub-screens are increased, the multi-screen split display can be carried out with suppressing an increase in circuit scale.

BRIEF DESCRIPTION OF THE DRAWINGS

FIG. 1 is a block diagram showing an example of a configuration of an existing signal switching apparatus;

FIG. 3 is a diagram showing an example of multiscreen split display signals;

FIG. 6 is a diagram showing an example of multiscreen split display signals;

FIG. 15 is a diagram showing another example of the multiscreen split display signal.

DETAILED DESCRIPTION OF THE PREFERRED EMBODIMENTS

Hereinafter, embodiments of the present disclosure will be described in detail with reference to the accompanying drawings in accordance with the following order:

1. First Embodiment (signal switching apparatus in case of multiscreen split display signal composed of video signals about PGM, PVW, CLEAN, and KPVW);

2. Second Embodiment (signal switching apparatus in case of multiscreen split display signal composed of key adjusting signals); and 3. Third Embodiment (signal switching apparatus in case of multiscreen split display signal of three-dimensional image).

4. Embodiment (program)

1. First Embodiment

Signal Switching Apparatus

[Configuration of Signal Switching Apparatus of First Embodiment]

Figure 2A:
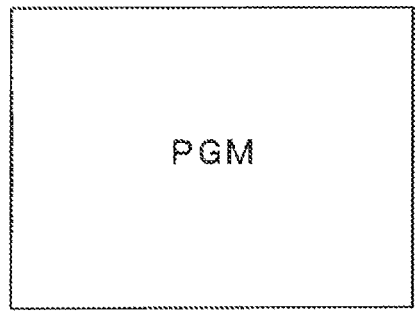
FIGS. 2A to 2D are respectively diagrams explaining an example of video signals outputted from a mix effect processing portion.
Figure 2B:
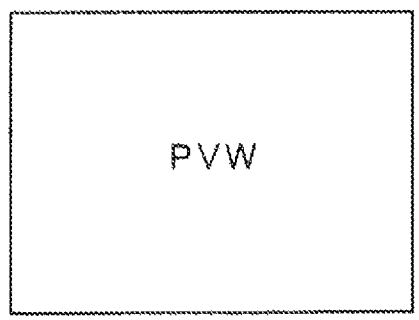
Figure 2C:
Figure 2D:
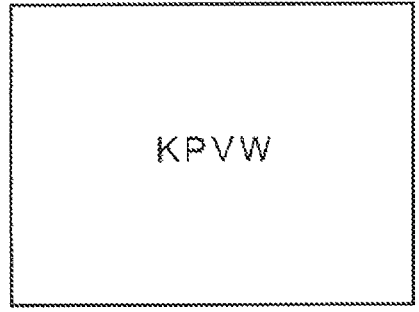
Figure 4:
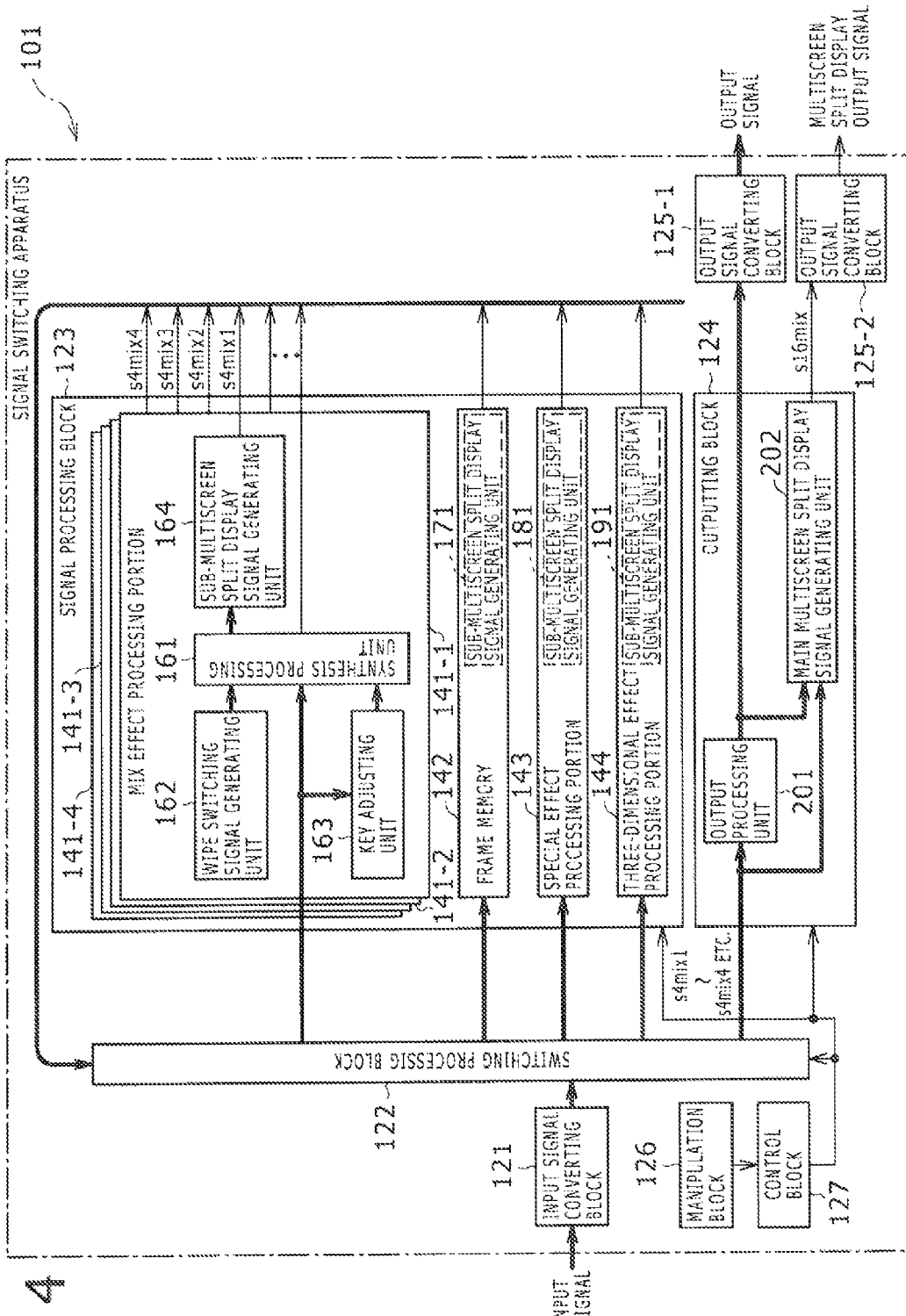
FIG. 4 is a block diagram showing a configuration example of a signal switching apparatus according to an embodiment of the present disclosure.

FIG. 4 is a block diagram showing a configuration of a signal switching apparatus 101 for program production according to a first embodiment of the present disclosure.

As shown in FIG. 4, the signal switching apparatus 101 is composed of an input signal converting block 121, a switching processing block 122, a signal processing block 123, an outputting block 124, an output signal converting block 125-1 and an output signal converting block 125-2, a manipulation block 126, and a control block 127.

The input signal converting block 121 converts a video signal inputted thereto from the outside into an intra-apparatus signal having a form which can be dealt with in the apparatus, that is, the signal switching apparatus 101, and outputs the intra-apparatus signal having such a form to the switching processing block 122. For example, in the first embodiment, a Serial Digital Interface (SDI) signal is adopted as the video signal inputted to the input signal converting block 121. In addition, for example, in the first embodiment, a differential signal is adopted as the intra-apparatus signal.

The switching processing block 122 selectively switches either the intra-apparatus signal inputted thereto from the input signal converting block 121, or the intra-apparatus signal re-inputted thereto from the signal processing block 123, and outputs the intra-apparatus signal thus selectively switched to a predetermined output destination. In FIG. 4, both of the signal processing block 123 and the outputting block 124 exist as the predetermined output destination. That is to say, the intra-apparatus signal (hereinafter suitably referred to as "the video signal" as well) outputted from the switching processing block 122 is inputted either to the signal processing block 123 or to the outputting block 124.

The signal processing block 123 subjects the intra-apparatus signal inputted thereto from the switching processing block 122 to various kinds of signal processing. While the signal processing block 123 subjects the intra-apparatus signal inputted thereto from the switching processing block 122 to the various kinds of signal processing, various kinds of video signals are generated. That is to say, in the first embodiment during execution of the signal processing by the signal processing block 123, intermediate generation signals are generated. The intra-apparatus signal which has been subjected to the various kinds of signal processing by the signal processing block 123 is outputted from the signal processing block 123 to be re-inputted to the switching processing block 122. It should be noted that a series of processing in which the intra-apparatus signal inputted from the switching processing block 122 to the signal processing block 123 is subjected to the various kinds of signal processing in the signal processing block 123, and is re-inputted to the switching processing block 122 is continuously executed plural times in some cases.

The signal processing block 123 is provided with mix effect processing portions 141-1 to 141-4. The mix effect processing portions 141-1 to 141-4 subject the intra-apparatus signal inputted thereto from the switching processing block 122 to mix effect processing such as wipe switching processing and key processing. In this case, in the mix effect processing, various kinds of effects are added to be mixed with one another. While the mix effect processing portions 141-1 to 141-4 subject the intra-apparatus signal inputted thereto from the switching processing block 122 to the mix effect processing, intermediate generation signals are generated. It is noted that when there is no need for individually distinguishing the mix effect processing portions 141-1 to 141-4 from one another are collectively referred to as "the mix effect processing portion 141."

The mix effect processing portion 141 is composed of a synthesis processing unit 161, a wipe switching signal generating unit 162, a key adjusting unit 163, and a sub-multiscreen split display signal generating unit 164 in order to execute such mix effect processing.

The synthesis processing unit 161 subjects the intra-apparatus signal inputted thereto from the switching generating block 122 to the mix effect processing. In addition, the synthesis processing unit 161 generates plural intermediate generation signals during execution of the mix effect processing.

For example, in the first embodiment, it is supposed that a video signal corresponding to an image (hereinafter referred to as "a video signal BGA") of a first scene (hereinafter referred to as "an image BGA"), and a video signal corresponding to an image (hereinafter referred to as "a video signal BGB") of a second scene (hereinafter referred to as "an image BGB") are both inputted from the switching processing block 122 to one mix effect processing portion 141.

In this case, the synthesis processing unit 161 executes processing in which the scene is gradually switched over to the other by spending a given period of time while two scenes (the image EGA and the image BGB) before and after switching are partitioned and synthesized with each other within the screen in accordance with both of the video signal BGA and the video signal BGB, that is, wipe switching processing. As a result, a video signal corresponding to an image CLEAN (hereinafter referred to as "a video signal CLEAN") as an image for which the wipe switching processing has been executed is generated.

A processing method for such wipe switching processing which is executed by the synthesis processing unit 161 is specified by using a wipe switching signal. In other words, the wipe switching signal means a signal with which a switching method relating to which scene of the two scenes is switched over to the other, and a processing method for the wipe switching processing such as a ratio in partition synthesis between the two scenes are specified.

The wipe switching signal generating unit 162 generates such a wipe switching signal, and outputs the wipe switching signal thus generated to the synthesis processing unit 161.

Also, the synthesis processing unit 161 executes processing for cutting out and synthesizing one or more objects selected from plural objects into the image CLEAN, that is, the key processing.

In this case, hereinafter, the video signal representing one object will be referred to as "a key adjusting signal." That is to say, the synthesis processing unit 161 synthesizes the key adjusting signals representing one or more objects selected from plural objects into the video signal CLEAN, thereby realizing the key processing.

The key adjusting unit 163 generates such a key adjusting signal every object as an object of the cutting out and the synthesis. For example, in the first embodiment, the eight objects are each an object of the cutting out and the synthesis, and thus key adjusting signals key 1 to key 8 corresponding to the eight objects, respectively, are generated.

In this case, each of the key adjusting signals key 1 to key 8 is set either in an ON state or in an OFF state. The ON state means utilization of the key adjusting signal in the key processing, whereas the OFF state means that utilization of the key adjusting signal is inhibited in the key processing. That is to say, the objects corresponding to the respective key adjusting signals, each set in the ON state, of the key adjusting signals key 1 to key 8 are cut out and synthesized with one another in the key processing. On the other hand, the objects corresponding to the respective key adjusting signals each set in the OFF state are cut out and synthesized with one another in the key processing.

In such a way, in the key processing, the key adjusting signals, each set in the ON state, of the key adjusting signals key 1 to key 8 are synthesized into the video signal CLEAN, thereby obtaining the video signal (intra-apparatus signal) of the program which will be finally broadcasted. Here, in the first embodiment, of the program which will be finally broadcasted, the video signals for a period of time necessary for the wipe switching processing are generated approximately for the same period by the synthesis processing unit 161.

In this case, the synthesis processing unit 161 generates both of a video signal corresponding to the image PGM (Program) as an object of display (hereinafter referred to as "a PGM video signal"), and a video signal corresponding to the next image PVW (Preview) after completion of the wipe switching processing (hereinafter referred to as "a PVW video signal") of the video signals of the program which will be finally broadcasted at a predetermined timing.

Also, at the predetermined timing at which both of the video signal PGM and the video signal PVW, both of a video signal CLEAN, and a video signal corresponding to an image KPVW (Key Preview) (hereinafter referred to as "a video signal KPVW") are obtained.

The video signal KPVW obtained here is a video signal equivalent to a signal obtained as a result of synthesizing all of the key adjusting signals key 1 to key 8 into the video signal CLEAN on the assumption that all of the key adjusting signals key 1 to key 8 are set in the ON state. Specifically, the key adjusting unit 163 synthesizes the key adjusting signals key 1 to key 8 with one another, thereby generating a synthesis key adjusting signal keyall. The synthesis processing unit 161 cuts out and synthesizes the synthetic key adjusting signal keyall into the video signal CLEAN, thereby generating the video signal KPVW.

In addition, at the predetermined timing at which both of the video signal PGM and the video signal PVW are generated, the key adjusting signals key 1 to key 8, and the wipe switching signal are also obtained.

Then, the synthesis processing unit 161 outputs the wipe switching signal, the key adjusting signals key 1 to key 8 and the synthetic key adjusting signal keyall, and the various kinds of video signals corresponding to PGM, PVW, CLEAN, and MPVW, respectively, to a sub-multiscreen split display signal generating unit 164. It is noted that some signals of these signals are re-inputted to the switching processing block 122 as well as may be necessary.

The sub-multiscreen split display signal generating unit 164 selectively switches an arbitrary number and arbitrary kinds of video signals from plural signals inputted thereto from the synthesis processing unit 161, and synthesizes these video signals thus selectively switched with one another, thereby generating a multiscreen split display signal. It should be noted that of the plural signals inputted from the synthesis processing unit 161, the wipe switching signal, the key adjusting signals key 1 to key 8, the video signal CLEAN, and the like are the intermediate generation signals.

It is noted that in order to clearly distinguish the multiscreen split display signal generated by the sub-multiscreen split display signal generating unit 164 from a multiscreen split display signal generated by a main multiscreen split display signal generating unit 202 which will be described later, hereinafter, the multiscreen split display signal generated by the sub-multiscreen split display signal generating unit 164 will be referred to as a sub-multiscreen split display signal.

In the first embodiment, it is supposed that the sub-multiscreen split display signal generating unit 164 selects the video signals PGM, PVW, CLEAN, and KPVW generated by the synthesis generating unit 161 and synthesizes the video signals thus selected, thereby generating a sub-multiscreen split display signal (hereinafter especially added with a sign s4mix).

[Sub-Multiscreen Split Display Signal s4mix]

Figure 5:
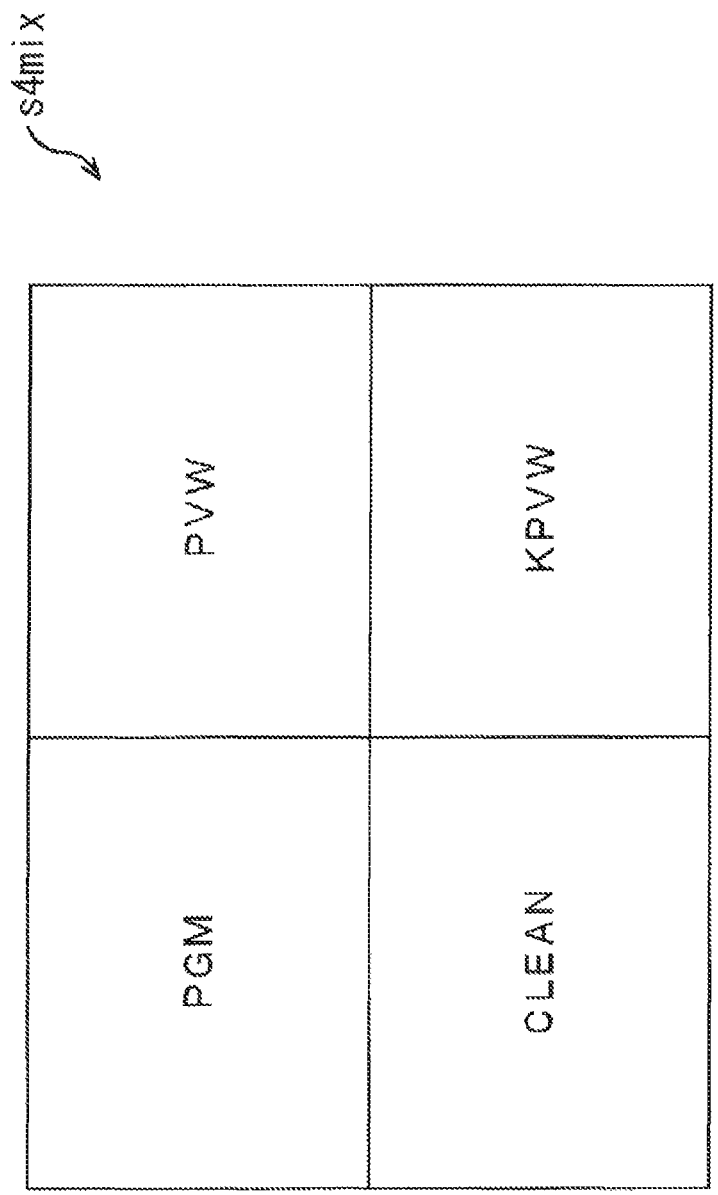
FIG. 5 is a diagram showing a sub-multiscreen split display signal.

FIG. 5 is a diagram showing the sub-multiscreen split display signal s4mix generated by the sub-multiscreen split display signal generating unit 164 in such a way.

The sub-multiscreen split display signal s4mix is composed of the video signals PGM, PVM, CLEAN, and KPVW. That is to say, if the sub-multiscreen split display signal s4mix (more exactly, the video signal whose output form has been converted) is inputted to the display device or the like (not shown), as shown in FIG. 5, the four kinds of images are displayed on the respective sub-screens in a split screen manner.

The sub-multiscreen split display signal generating portions 164 of the mix effect processing portions 141-1 to 141-4 generate the sub-multiscreen split display signals s4mix, respectively, independently of one another. That is to say, one kind of sub-multiscreen split display signal s4mix is outputted from each of the sub-multiscreen split display signal generating portions 164 of the four mix effect processing portions 141-1 to 141-4. Therefore, as a whole, the four kinds of sub-multiscreen split display signals s4mix in total are outputted from the four mix effect processing portions 141-1 to 141-4, respectively, to be re-inputted to the switching processing block 122.

The signal processing block 123 is further provided as the constituent elements for subjecting the intra-apparatus signals inputted thereto from the switching processing block 122 to the various kinds of signal processing with a frame memory 142, a special effect processing portion 143, and a three-dimensional effect processing portion 144 in addition to such mix effect processing portions 141-1 to 141-4.

The frame memory 142 stores therein either the intra-apparatus signals inputted thereto from the switching processing block 122 or the intra-apparatus signals generated in the signal processing executed by other constituent elements included in the signal processing block 123 (that is, including the intermediate generation signals and the sub-multiscreen split display signals) in frames.

The frame memory 142 is configured so as to include a sub-multiscreen display signal generating unit 171. The sub-multiscreen display signal generating unit 171 selectively switches an arbitrary number and arbitrary kinds of intra-signals from the intra-apparatus signals for plural frames stored therein, synthesizes the intra-signals thus selectively switched into a sub-multiscreen split display signal, and re-inputs the resulting sub-multiscreen split display signal to the switching processing block 122. If the sub-multiscreen split display signal generated by the sub-multiscreen display signal generating unit 171 is inputted to the display device or the like (not shown), for example, plural kinds of images are displayed on the respective sub-screens in the split screen manner.

The special effect processing portion 143 successively subjects at least a part of either plural intra-apparatus signals inputted thereto from the switching processing block 122, or the intra-apparatus signals generated in the signal processing executed by other constituent elements included in the signal processing block 123 (that is, including the intermediate generation signals and the sub-multiscreen split display signals) to special effect processing such as filtering processing, enlargement and reduction processing, and mosaic processing. While the special effect processing portion 143 executes the special effect processing, plural intermediate generation signals are generated. For example, signals after completion of the filtering processing and before the enlargement and reduction processing, and the mosaic processing, signals after completion of the filtering processing and the enlargement and reduction processing, and before the mosaic processing, and the like become the intermediate generation signals.

The special effect processing portion 143 is configured so as to include a sub-multiscreen split display signal generating unit 181. The sub-multiscreen split display signal generating unit 181 selectively switches an arbitrary number and arbitrary kinds of intra-apparatus signals from plural intra-apparatus signals which have been suitably subjected to the special effect processing, and one or more intermediate generation signals generated during execution of the special effect processing, synthesizes the intra-apparatus signals thus selectively switched with one another to generate a sub-multiscreen split display signal, and re-inputs the sub-multiscreen split display signal thus generated to the switching processing block 122. If the sub-multiscreen split display signal generated by the sub-multiscreen split display signal generating unit 181 is inputted to the display device or the like (not shown), plural kinds of images such as the image which has been subjected to only the filtering processing, the image which has been subjected to the enlargement and reduction processing, and the image which has been partially subjected to the mosaic processing are displayed on the respective sub-screens in the split screen manner.

The three-dimensional effect processing portion 144 generates an intra-apparatus signal for a left eye and an intra-apparatus signal for a right eye for display of a three-dimensional image from plural intra-apparatus signals inputted thereto from the switching processing block 122, or plural intra-apparatus signals generated by other constituent elements included in the signal processing block 123 (that is, including the intermediate generation signals and the sub-multiscreen split display signals), and processes the intra-apparatus signal for the left eye and the intra-apparatus signal for the right eye for display of the three-dimensional image. While the three-dimensional effect processing portion 144 executes the processing for generating the intra-apparatus signals for display of the three-dimensional image, plural intermediate generation signals are generated. For example, the intra-apparatus signal for the left eye and the intra-apparatus signal for the right eye for which the degree of irregularities of the object to be displayed is variously set so as not to provide a feeling of strangeness in the human eye when the three-dimensional image is displayed are generated as the intermediate generation signals.

The three-dimensional processing portion 144 is configured so as to include a sub-multiscreen split display signal generating unit 191. The sub-multiscreen split display signal generating unit 191 selectively switches an arbitrary number and arbitrary kinds of intra-apparatus signals for the left eye, and plural intermediate generation signals from the plural intra-apparatus signals for the left eye, and one or more intermediate generation signals generated during execution of the processing for generating plural intra-apparatus signals for display of the three-dimensional image, and synthesizes the arbitrary number and arbitrary kinds of intra-apparatus signals for the left eye, and plural intermediate generation signals with one another, thereby generating the sub-multiscreen split display signal for the left eye. The sub-multiscreen split display signal generating unit 191 selectively switches an arbitrary number and arbitrary kinds of intra-apparatus signals for the right eye from the intra-apparatus signals for the right eye, and one or more intermediate generation signals generated during execution of the processing for generating the intra-apparatus signals for display of the three-dimensional image, and synthesizes the arbitrary number and arbitrary kinds of intra-apparatus signals for the right eye with one another, thereby generating the sub-multiscreen split division display signal for the right eye. The sub-multiscreen split display for the left eye and the sub-multiscreen split display signal for the right eye which have been generated in such a way are re-inputted to the switching processing block 122. If the sub-multiscreen split display signals generated by the sub-multiscreen split display signal generating unit 191 are inputted to the display device or the like (not shown), for example, the images in which the objects are displayed with the various degrees of the irregularities are displayed on the respective sub-screens in the split screen manner.

It is noted that in the first embodiment, the sub-multiscreen split display signal generating units 164, 171, 181, and 191 are provided as the constituent elements of the mix effect processing portions 141-1 to 141-4, the frame memory 142, the special effect processing portion 143, and the three-dimensional effect processing portion 144, respectively. However, it is enough for each of the sub-multiscreen split display signal generating units 164, 171, 181, and 191 to have a function of being capable of selectively switching an arbitrary number and arbitrary kinds of signals from plural video signals inputted, and the intermediate generation signals, and synthesizing the arbitrary number and arbitrary kinds of signals thus selectively switched, thereby generating the sub-multiscreen split display signal. That is to say, the disposition positions of the sub-multiscreen split display signal generating units 164, 171, 181, and 191 are especially by no means limited to the case of FIG. 4, and thus, for example, may lie outside the signal processing block 123.

The signal processing block 123 is suitably provided with constituent elements for executing other various kinds of signal processing in addition to the constituent elements described above, that is, the mix effect processing portion 141, the frame memory 142, the special effect processing portion 143, and the three-dimensional effect processing portion 144.

All of kinds of video signals are inputted from the signal processing block 123 to the switching processing block 122 in such a way. The video signals re-inputted to the switching processing block 122 are suitably outputted to the outputting block 124. Here, in the following description, for the sake of convenience of the description, in order to make the comparison with the existing switching apparatus 1 shown in FIG. 1 easy, it is defined that the signals outputted from the switching processing block 122 are composed of a video signal group for multiscreen split display generation, and a post-edition video signal.

However, in the existing switching apparatus 1 shown in FIG. 1, an aggregate in which 16 kinds of video signals each corresponding to a single body of any of the images PGM, PVW, CLEAN, and KPVW were collected was adopted as the video signal group for the multiscreen split display generation. On the other hand, in the signal switching apparatus 101 of the first embodiment, an aggregate of the sub-multiscreen split display signals s4mix1 to s4mix4 corresponding to the quarter image in which the images PGM, PVW, CLEAN, and KPVW are synthesized with one another is adopted as the video signal group for the multiscreen split display generation.

The outputting block 124 subjects either the video signal group for the multiscreen split display generation inputted thereto from the switching processing block 122, or the post-edition video signal to the various kinds of signal processing, and outputs either the video signal group for the multiscreen split display generation or the post-edition video signal to either the output signal converting block 125-1 or 125-2.

The outputting block 124 is composed of an output processing unit 201, and a main multiscreen split display signal generating unit 202.

The output processing unit 201 subjects the post-edition video signal inputted thereto from the switching processing block 122 to output processing such as safe title or super impose as may be necessary, and outputs the resulting post-edition video signal to the output signal converting block 125-1. Also, the output signal converting block 125-1 subjects the video signal group for the multiscreen split display generation inputted thereto from the switching processing block 122, that is, the four kinds of sub-multiscreen split display signals s4mix1 to s4mix4 to the output processing such as the safe title or the super impose as may be necessary, and outputs the resulting four kinds of sub-multiscreen split display signals s4mix1 to s4mix4 to the main multiscreen split display signal generating unit 202.

The output signal converting block 125-1 converts the post-edition video signal inputted thereto from the output processing unit 201 from the form of the intra-apparatus signal into a form of the intra-apparatus signal suitable for the display device or the like (not shown), specifically, converts the differential signal into the SDI signal in the first embodiment, and outputs the resulting SDI signal as the output signal to the display device or the like (not shown).

The main multiscreen split display signal generating unit 202 selectively switches the video signals having the number of split display in the multiscreen split display, that is, the total number of sub-screens from plural video signals inputted thereto either from the switching processing block 122 or the output processing unit 201.

However, in the first embodiment, all of the video signal group of multiscreen split display generation, that is, the four kinds of sub-multiscreen split display signals s4mix1 to s4mix4 are selected as they are.

The main multiscreen split display signal generating unit 202 synthesizes the four kinds of sub-multiscreen split display signals s4mix1 to s4mix4 with one another in such a way that the images corresponding to the four kinds of sub-multiscreen split display signals s4mix1 to s4mix4 thus selected, respectively, can be displayed on the respective sub-screen in the split screen manner. As a result, 16-split multiscreen split display signals are generated and are then outputted to the output signal converting block 125-2.

[Example of Multiscreen Split Display Signal s16mix]

FIG. 6 is a diagram showing an example of the multiscreen split display signal s16mix outputted from the main multiscreen split display signal generating unit 202.

In the example shown in FIG. 6, the main multiscreen split display signal generating unit 202, as described above, selects all of the sub-multiscreen split display signals s4mix1 to s4mix4 outputted from the mix effect processing portions 141-1 to 141-4, respectively. Also, the main multiscreen split display signal generating unit 202 synthesizes the sub-multiscreen split display signals s4mix1 to s4mix4 with one another, thereby generating the multiscreen split display signal s16mix. That is to say, in the display device or the like (not shown) to which the multiscreen split display signal s16mix (more exactly, the video signal whose output form has been converted by the output signal converting block 125-2) is inputted, as shown in FIG. 6, 16 kinds of images are displayed on the respective sub-screens in the split screen manner. In such a way, the multiscreen split display of 16-splits is realized.

Characters within the respective sub-screens shown in FIG. 6 represent the kinds of images displayed on the respective sub-screens. "#K" illustrated within each of the sub-screens corresponds to the final character "K" of the code in the mix effect processing portion 141-K. That is to say, of the images corresponding to the sub-multiscreen split display signals s4mix K outputted from the mix effect processing portion 141-K, respectively, the image having the kind illustrated within the sub-screen concerned is displayed within the sub-screen in which "#K" is illustrated.

Specifically, a synthetic image in which the images PGM, PVW, CLEAN, and KPVW corresponding to the sub-multiscreen split display signal s4mix1 outputted from the mix effect processing portion 141-1 are quarter-disposed on the left, right, top, and bottom, respectively, is displayed on the top-left sub-screen in which "#1" is illustrated (that is, an aggregate of (2×2) sub-screens). Likewise, a synthetic image in which the images PGM, PVW, CLEAN, and KPVW corresponding to the sub-multiscreen split display signal s4mix2 outputted from the mix effect processing portion 141-2 are quarter-disposed on the left, right, top, and bottom, respectively, is displayed on the top-right sub-screen in which "#2" is illustrated (that is, an aggregate of (2×2) sub-screens). A synthetic image in which the images PGM, PVW, CLEAN, and KPVW corresponding to the sub-multiscreen split display signal s4mix3 outputted from the mix effect processing portion 141-3 are quarter-disposed on the left, right, top, and bottom, respectively, is displayed on the bottom-left sub-screen in which "#3" is illustrated (that is, an aggregate of (2×2) sub-screens). Also, a synthetic image in which the images PGM, PVW, CLEAN, and KPVW corresponding to the sub-multiscreen split display signal s4mix4 outputted from the mix effect processing portion 141-4 are quarter-disposed on the left, right, top, and bottom, respectively, is displayed on the bottom-right sub-screen in which "#4" is illustrated (that is, an aggregate of (2×2) sub-screens).

The output signal converting block 125-2 converts the multiscreen split display signal s16mix outputted from the main multiscreen split display signal generating unit 202 from the form of the intra-apparatus signal into the form of the intra-apparatus signal suitable for the display device or the like (not shown). Specifically, in the first embodiment, the multiscreen split display signal s16mix is converted from the form of the differential signal into the form of the SDI signal, and is then outputted as an output signal to the display device or the like (not shown). As a result, as described above, the 16-split screens shown in FIG. 6 are displayed on the display device or the like (not shown).

The manipulation block 126 receives a manipulation made by a user, and outputs a signal corresponding to the manipulation to the control block 127. The manipulation block 126, for example, is composed of a keyboard, a touch panel, a button, a switch, a fader lever, or the like.

The control block 127 controls the processing in the switch processing block 122, the signal processing block 123, and the outputting block 124 in accordance with the signal inputted thereto from the manipulation block 126.

The configuration of the signal switching apparatus 101 of the first embodiment has been described so far. Next, details of the mix effect processing executed by the mix effect processing 141 will be described.

[Details of Mix Effect Processing]

Figure 7:
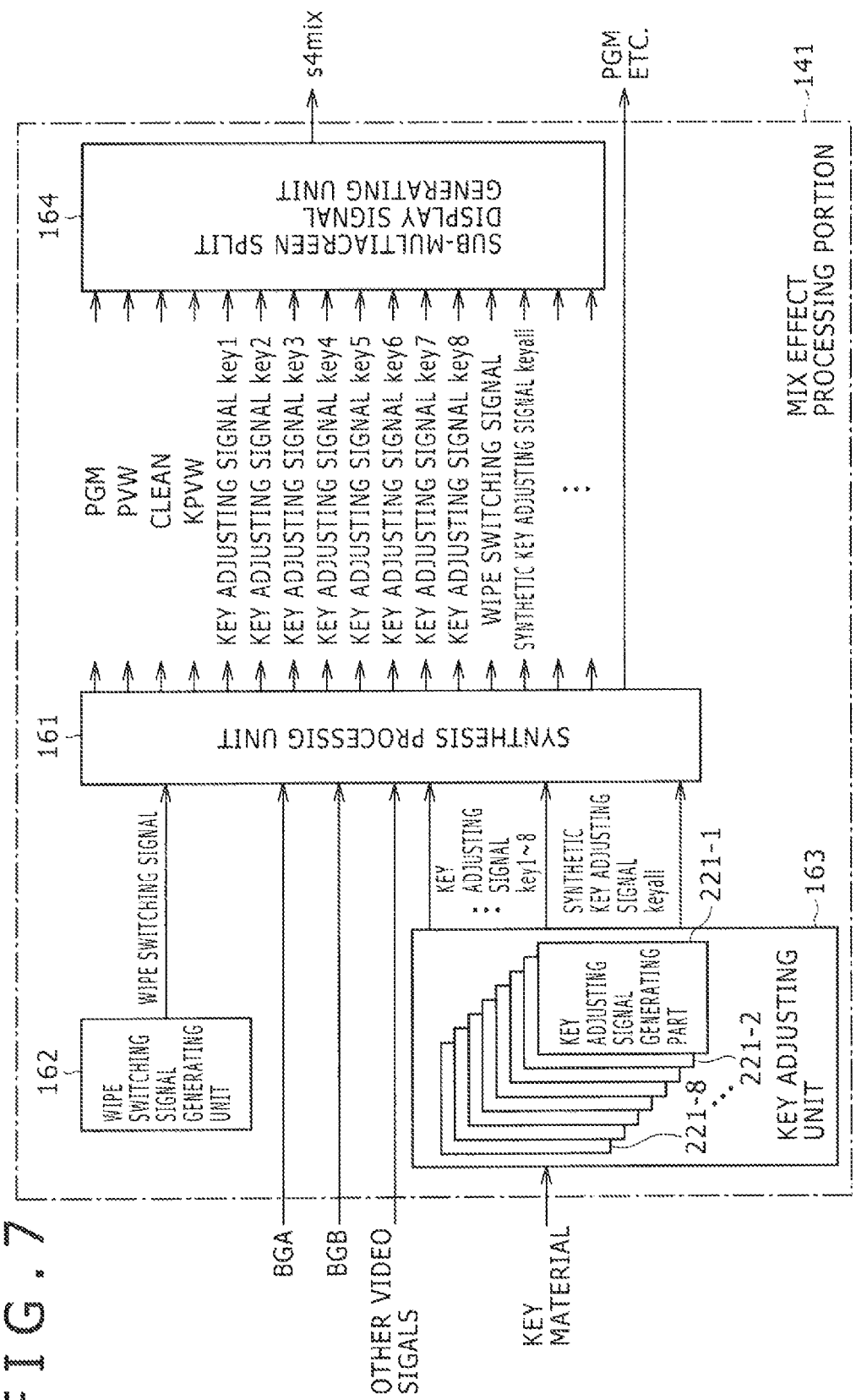
FIG. 7 is a block diagram showing a configuration of a mix effect processing portion.

FIG. 7 is a block diagram showing a configuration of the mix effect processing 141.

The mix effect processing 141 is composed of a synthesis processing unit 161, a wipe switching signal generating unit 162, a key adjusting unit 163, and a sub-multiscreen split display signal generating unit 164.

The synthesis processing unit 161 subjects the intra-apparatus signals inputted thereto from the switching processing block 122 to the mix effect processing.

the video signal BGA, the video signal BGB, and other video signals are inputted from the switching processing block 122 to the synthesis processing unit 161. In the first embodiment, it is supposed that of these video signals, both of the video signal BGA and the video signal BGB are subjected to the mix effect processing.

[Example of Image BGA]

Figure 8:
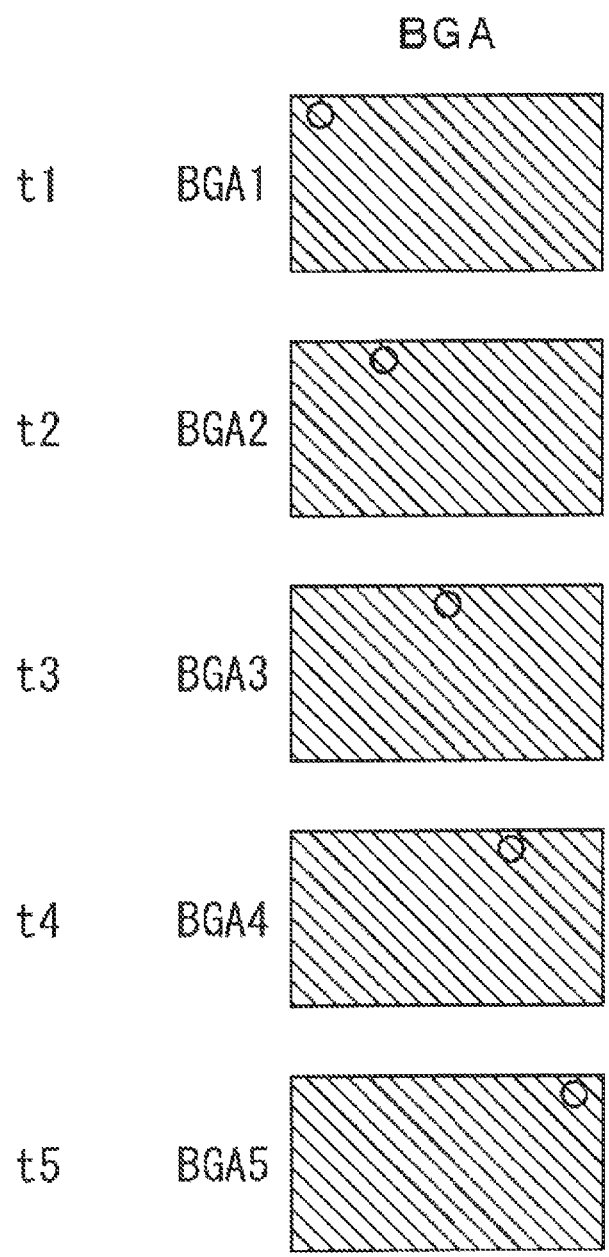
FIG. 8 is a diagram showing an example of an image BGA.

FIG. 8 is a diagram showing an example of the image BGA.

BGA 1 to BGA 5 are images of a frame of the video signal BGA as an object of display from time t1 to time t5.

Here, each of time t1 to time t5 means relative time with respect to reference time in the case where predetermined time at which an image of a program is displayed is set as the reference time. Thus, the time elapses from the reference time as a numerical value added after a code, t, further increases. This also applies to FIGS. 9 and 11 which will be described later.

That is to say, when from the time t1 to the time t5, the images BGA 1 to BGA 5 are displayed on the display device or the like (not shown), as shown in FIG. 8, a situation is displayed in which an object indicated by a circle moves from the left-hand side to the right-hand side on the upper portion of the screen.

[Example of Image BGB]

Figure 9:
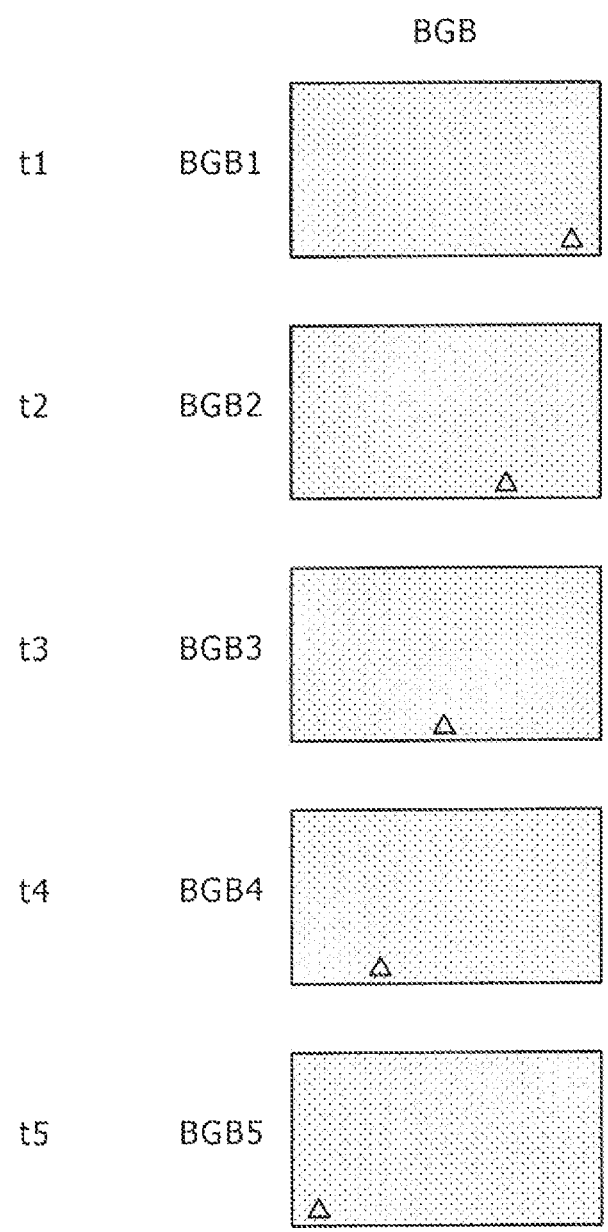
FIG. 9 is a diagram showing an example of an image BGB.

FIG. 9 is a diagram showing an example of the image BGB.

Images BGB 1 to BGB 5 are images of a frame of the video signal BGB as an object of display from time t1 to time t5.

When from the time t1 to the time t5, the images BGB 1 to BGB 5 are displayed on the display device or the like (not shown), as shown in FIG. 9, a situation is displayed in which an object indicated by a triangle moves from the right-hand side to the left-hand side on the lower portion of a screen.

The synthesis processing unit 161 executes the wipe switching processing for both of the video signal BGA and the video signal BGB in accordance with a wipe switching signal generated by the wipe switching signal generating unit 162. As a result, the video signal CLEAN is generated.

The wipe switching signal generating unit 162 generates the wipe switching signal with which a processing method for the wipe switching processing is regulated, and outputs the wipe switching signal thus generated to the synthesis processing unit 161.

The synthesis processing unit 161 also executes processing for synthesizing the key adjusting signals of one or more objects selected from plural objects into the video signal CLEAN, that is, key processing.

The key adjusting unit 163 is configured so as to include key adjusting signal generating parts 221-1 to 221-8. The key adjusting signal generating parts 221-1 to 221-8 generate key adjusting signals key 1 to key 8 corresponding to eight objects as an object of the cutting-out and the synthesis, respectively.

In addition, in the first embodiment, the key adjusting unit 163 synthesizes the key adjusting signals key 1 to key 8 generated by the key adjusting signal generating parts 221-1 to 221-8, respectively, thereby generating a synthetic key adjusting signal keyall.

[Concrete Example of Key Adjusting Signal and Synthetic Key Adjusting Signal]

Figure 10:
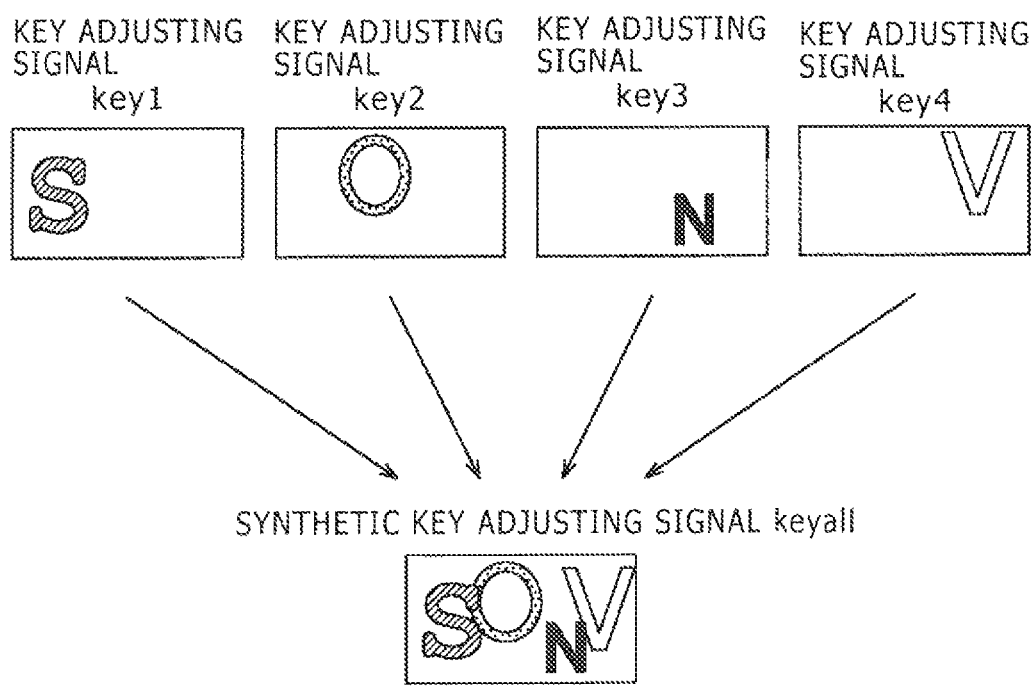
FIG. 10 is a diagram explaining a key adjusting signal and a synthetic key adjusting signal.

FIG. 10 is a diagram explaining the key adjusting signals and the synthetic key adjusting signal. It is noted that since in the first embodiment, the key adjusting unit 163 includes the key adjusting signal generating parts 221-1 to 221-8, the key adjusting unit 163 can generate the eight kinds of key adjusting signals key 1 to key 8. However, in FIG. 10, for the sake of simplicity of the description, the key adjusting unit 163 generates only four kinds of key adjusting signals key 1 to key 4.

The key adjusting signal key 1 is generated by the key adjusting signal generating part 221-1. In the example shown in FIG. 10, the key adjusting signal key 1 is a signal containing therein the alphabet "S" as an object. Therefore, when the key processing using the key adjusting signal key 1 is executed for the video signal CLEAN, "S" is cut out for the image CLEAN to be subjected to the synthesis.

The key adjusting signal key 2 is generated by the key adjusting signal generating part 221-2. In the example shown in FIG. 10, the key adjusting signal key 2 is a signal containing therein the alphabet "O" as an object. Therefore, when the key processing using the key adjusting signal key 2 is executed for the video signal CLEAN, "O" is cut out for the image CLEAN to be subjected to the synthesis.

The key adjusting signal key 3 is generated by the key adjusting signal generating part 221-3. In the example shown in FIG. 10, the key adjusting signal key 3 is a signal containing therein the alphabet "N" as an object. Therefore, when the key processing using the key adjusting signal key 3 is executed for the video signal CLEAN, "N" is cut out for the image CLEAN to be subjected to the synthesis.

The key adjusting signal key 4 is generated by the key adjusting signal generating part 221-4. In the example shown in FIG. 10, the key adjusting signal key 4 is a signal containing therein the alphabet "V" as an object. Therefore, when the key processing using the key adjusting signal key 4 is executed for the video signal CLEAN, "V" is cut out for the image CLEAN to be subjected to the synthesis.

It is noted that all of the key adjusting signals (the four key adjusting signals key 1 to key 4 in the case of the example shown in FIG. 10) are synthesized with one another by the key adjusting unit 163, thereby generating the synthetic key adjusting signal keyall.

In the individual pieces of key processing, the four key adjusting signals key 1 to key 4 are each set either in an ON state or in an OFF state, and are collectively used in the key processing. That is to say, in the key processing, the objects corresponding to the key adjusting signals, respectively, each set in the ON state, of the four key adjusting signals key 1 to key 4 are cut out for the image CLEAN to be subjected to the synthesis. On the other hand, the objects corresponding to the key adjusting signals, respectively, each set in the OFF state are not cut (inhibited from being cut out) for the image CLEAN to be subjected to the synthesis.

[Setting States of Key Adjusting Signals]

Figure 11:
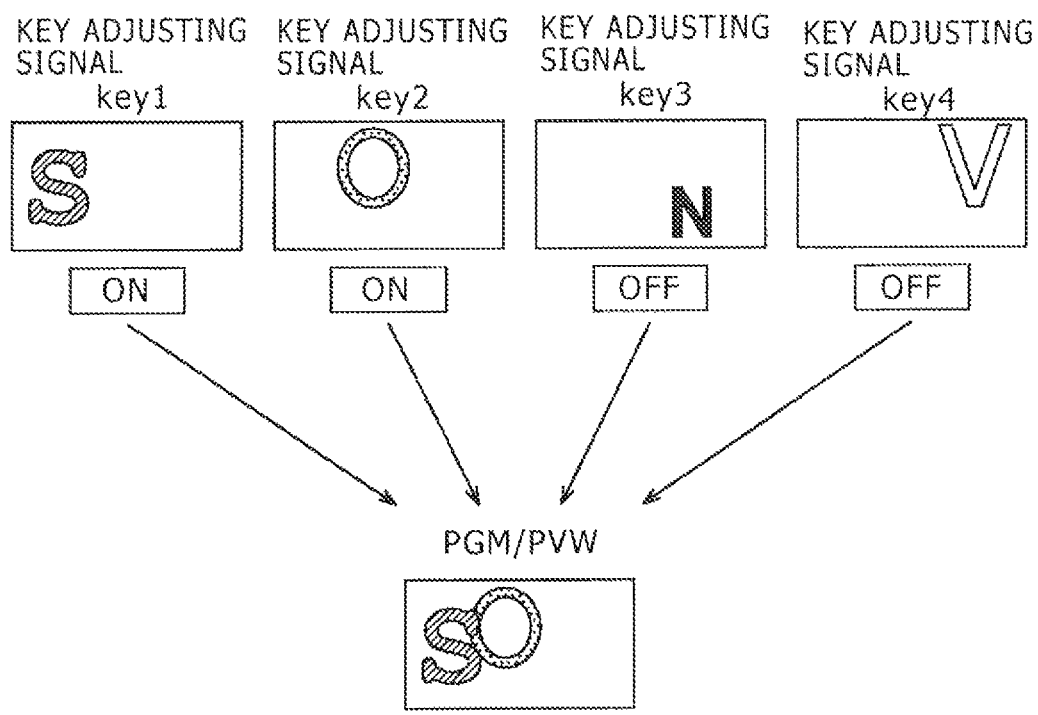
FIG. 11 is a diagram explaining a setting state of the key adjusting signal.

FIG. 11 is a diagram explaining the setting states of the key adjusting signals.

Specifically, for example, in an example shown in FIG. 11, each of the key adjusting signal key 1 and the key adjusting signal key 2 is set in the ON state, and each of the key adjusting signal key 3 and the key adjusting signal key 4 is set in the OFF state. For this reason, in the key processing, "S" corresponding to the key adjusting signal key 1, and "O" corresponding to the key adjusting signal key 2 are cut out for the image CLEAN to be subjected to the synthesis. On the other hand, "N" corresponding to the key adjusting signal key 3, and "V" corresponding to the key adjusting signal key 4 are not subjected to the synthesis. That is to say, a video signal corresponding to an image in which "S" and "O" are superimposed on the image CLEAN is obtained either as the video signal PGM or as the video signal PVW.

In addition, processing for synthesizing the synthetic key adjusting signal keyall and the video signal CLEAN with each other, thereby generating the video signal KPVW is executed separately from the key processing. That is to say, the video signal corresponding to the image in which all of the key adjusting signals key 1 to key 4, in the example of FIG. 11, all of "S," "O," "N," and "V" are superimposed on the image CLEAN is obtained as the video signal KPVW. In other words, a video signal equivalent to the video signal obtained in the key processing in which all of the key adjusting signals key 1 to key 4 are set in the ON state irrespective of the setting of either the ON state or the OFF state in the actual key processing is obtained as the video signal KPVW.

The example of the key processing using only the key adjusting signals key 1 to key 4 has been described so far for the sake of convenience of the description with reference to FIGS. 10 and 11. However, in the first embodiment, the key adjusting signals key 1 to key 8 are used in the key processing, and the video signal KPVW is generated by using the synthetic key adjusting signal keyall obtained as a result of synthesizing the key adjusting signals key 1 to key 8 with one another.

In such a way, the wipe switching signal from the wipe switching signal generating unit 162, and the key adjusting signals key 1 to key 8 and the synthetic key adjusting signal keyall from the key adjusting unit 163 are inputted to the synthesis processing unit 161.

The synthesis processing unit 161 subjects both of the video signal BGA and the video signal BGB to the mix effect processing such as the wipe switching processing and the key processing by suitably using the wipe switching signal, the key adjusting signals key 1 to key 8, and the synthetic key adjusting signal keyall. As a result, the video signals corresponding to the images PGM, PVM, CLEAN, and KPVW, respectively, are generated.

[Images PGM, PVW, CLEAN, and KPVW]

Figure 12:
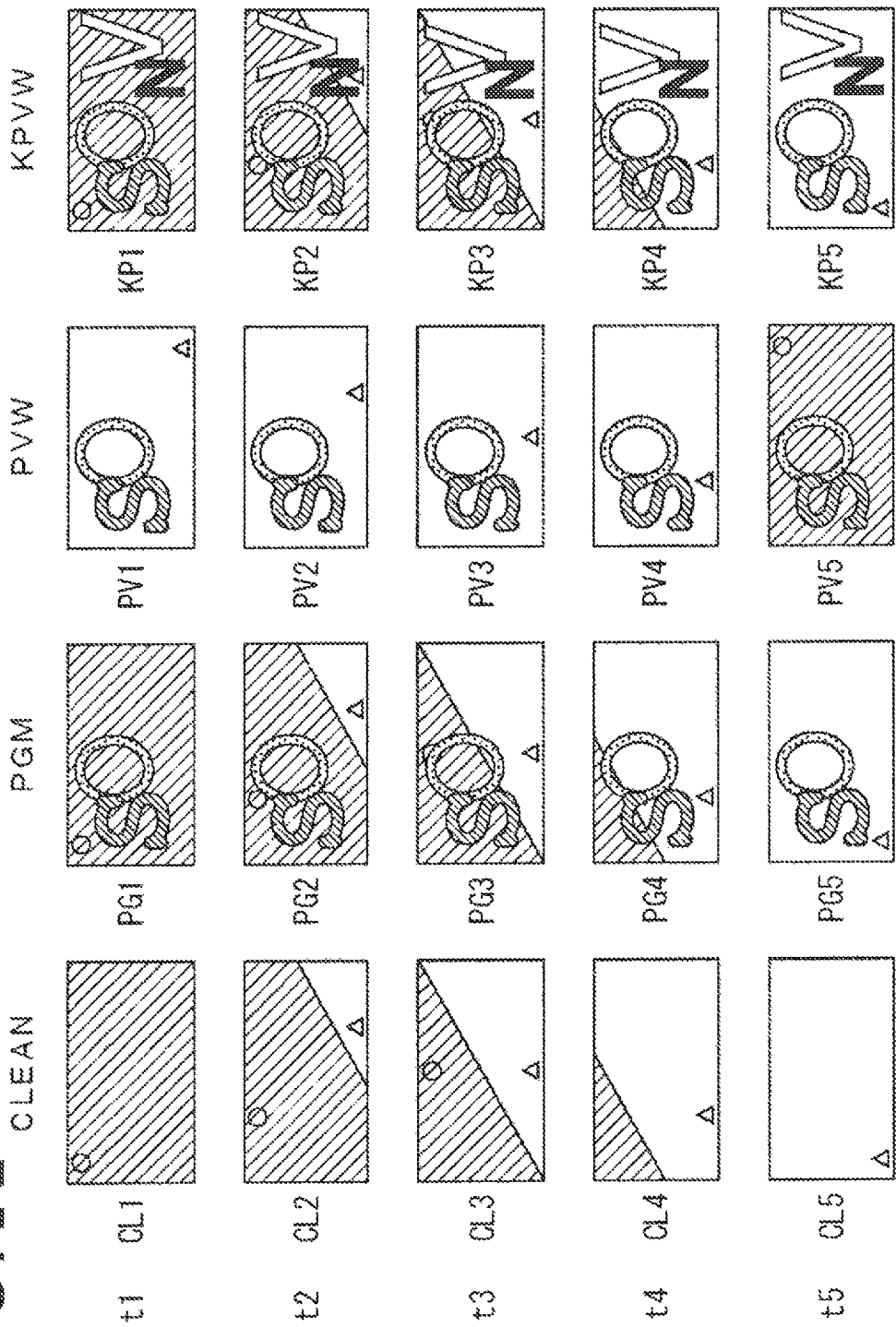
FIG. 12 is a diagram showing images corresponding to video signals, respectively, generated by a synthesis processing portion.

FIG. 12 is a diagram showing the images PGM, PVM, CLEAN, and KPVW.

The synthesis processing unit 161 subjects the video signal BGA and the video signal BGB inputted thereto to the wipe switching processing by using the wipe switching signal, thereby generating the video signal CLEAN. The images after completion of the wipe switching processing, that is, the two scenes before and after the switching, that is, the image into which the image BGA and the image BGB are synthe-sized with each other in the split screen manner is the image CLEAN which is shown on the leftmost-hand side of FIG. 12.

Images CL 1 to CL 5 are images of a frame of the video signal CLEAN as an object of display from time t1 to time t5. When the images CL 1 to CL 5 are displayed on the display device or the like (not shown) from the time t1 to the time t5, respectively, as shown in FIG. 12, a situation is displayed in which from the time t1 to the time t5, the image is gradually switched from the image BGA to the image BGB.

The image CL 1 is an image obtained from a process such that a synthesis ratio in the horizontal direction is set to 100% for the image BGA 1, and is set 0% for the image BGB 1, and under this condition, the image BGA 1 and the image BGB 1 are synthesized with each other in the split screen manner.

The image CL2 is an image obtained from the process such that a synthesis ratio in the horizontal direction is set to 80% for the image BGA 2, and is set 20% for the image BGB 2, and under this condition, the image BGA 2 and the image BGB 2 are synthesized with each other from the bottom right direction to the top left direction in the split screen manner.

The image CL 3 is an image obtained from the process such that a synthesis ratio in the horizontal direction is set to 50% for the image BGA 3, and is set 50% for the image BGB 3, and under this condition, the image BGA 3 and the image BGB 3 are synthesized with each other from the bottom right direction to the top left direction in the split screen manner.

The image CL 4 is an image obtained from the process such that a synthesis ratio in the horizontal direction is set to 20% for the image BGA 4, and is set 80% for the image BGB 4, and under this condition, the image BGA 4 and the image BGB 4 are synthesized with each other from the bottom right direction to the top left direction in the split screen manner.

The image CL 5 is an image obtained from the process such that a synthesis ratio in the horizontal direction is set to 0% for the image BGA 5, and is set 100% for the image BGB 5, and under this condition, the image BGA 5 and the image BGB 5 are synthesized with each other from the bottom right direction to the top left direction in the split screen manner.

The synthesis ratio of the image BGA and the image BGB in the image CLEAN is changed in conjunction with an amount of operation by vertically manipulating the fader lever composing a part of the manipulation block 126. That is to say, by manipulating the fader lever from the upper side to the lower side, the wipe switching signal corresponding to the manipulation is outputted to the synthesis processing unit 161. As a result, the video signal CLEAN is obtained in which as shown in FIG. 12, the image is gradually switched from the image BGA to the image BGB. On the other hand, by manipulating the fader lever from the lower side to the upper side, the wipe switching signal corresponding to the manipulation is outputted to the synthesis processing unit 161. As a result, the video signal CLEAN is obtained in which the image is gradually switched from the image BGB to the image BGA.

The image obtained as a result of the key processing of cutting out the predetermined object and subjecting the predetermined object to the synthesis for the image CLEAN is the image PGM as the image of the program which will be finally broadcasted. In the example shown in FIG. 12, an image PGM obtained from a process such that the object corresponding to the key adjusting signals, each set in the ON state, of the key adjusting signals key 1 to key 4 in the example shown in FIG. 11, that is, the objects of "S" and "O" of "S," O," "N," and "O" are cut out and are subjected to the synthesis for the image CLEAN is shown for the sake of simplicity of the description. That is to say, images PG 1 to PG 5 which are shown in the secondly place from the left-hand side of FIG. 12 are images of the frame of the video signal PGM as an object of display from the time t1 to the time t5.

Images PV 1 to PV 5 shown in the thirdly place from the left-hand side of FIG. 12 are images of a frame of the video signal PVW as an object of display from time t1 to time t5.

The image PVW is an image obtained in a process such that the objects ("S" and "O" in the case of FIG. 11) corresponding to the key adjusting signals, respectively, each set in the ON state, of the key adjusting signals key 1 to key 4 are cut out and subjected to the synthesis for a background image after completion of the image switching processing. Here, for the time t1 to the time t4, the background image after completion of the wipe switching processing is the image BGB. More specifically, the background images after completion of the wipe switching processing from the time t1 to the time t4 are the images BGB 1 to BGB 4 of FIG. 8, respectively. Therefore, images PV 1 to PV 4 from the time t1 to the time t4 become images obtained in a process such that the objects ("S" and "O" in the case of FIG. 11) corresponding to the key adjusting signals, respectively, each set in the ON state, of the key adjusting signals key 1 to key 4 are cut out and subjected to the synthesis for the images BGB 1 to BGB 4, respectively. It is noted that since the background image after completion of the wipe switching processing at the time t5 is perfectly switched over to the image BGB at the time t5, the background image after completion of the wipe switching processing at the time t5 becomes the image BGA to which the image is next switched over. Therefore, the image PV 5 at the time t5 becomes an image obtained in a process such that the objects ("S" and "O" in the case of FIG. 11) corresponding to the key adjusting signals, respectively, each set in the ON stare, of the key adjusting signals key 1 to key 4 are cut out and subjected to the synthesis for the image BGA 5.

On the other hand, although not illustrated, when the fader lever is manipulated from the lower side to the upper side, the image PVW becomes an image as will be described below. That is to say, a background image after completion of the wipe switching processing at the time t1 becomes the image BOB. Therefore, the image PV 1 at the time t1 becomes an image obtained in a process such that the objects ("S" and "O" in the case of FIG. 11) corresponding to the key adjusting signals, respectively, each set in the ON stare, of the key adjusting signals key 1 to key 4 are cut out and subjected to the synthesis for the image BOB 1. For the time t2 to the time t5, a background image after completion of the wipe switching processing is the image BGA. More specifically, the background image after completion of the wipe switching processing for the time t2 to the time t5 are the images BGA 2 to BGA 5 of FIG. 8, respectively. Therefore, images PV 2 to PV 5 become images obtained in a process such that the objects ("S" and "O" in the case of FIG. 11) corresponding to the key adjusting signals, respectively, each set in the ON stare, of the key adjusting signals key 1 to key 4 are cut out and subjected to the synthesis for the images BGA 2 to BGA 5, respectively.

The image KPVW shown on the rightmost-hand side of FIG. 12 is an image equivalent to an image obtained in a process such that all of the key adjusting signals key 1 to key 4 are synthesized with the image signal CLEAN on the assumption that all of the key adjusting signals key 1 to key 4 are set in the ON state. That is to say, the video signal obtained as a result of synthesizing the synthetic key adjusting signal keyall into which all of the key adjusting signals key 1 to key 4 are synthesized with the video signal CLEAN is the video signal KPVW.

Images KP 1 to KP 5 are images of a frame of the video signal KPVW as an object of display for the time t1 to the time t5. When the images KP 1 to KP 5 are displayed on the display device or the like (not shown) for the time t1 to the time t5, respectively, as shown in FIG. 12, a situation is displayed in which all of the objects corresponding to the key adjusting signals key 1 to key 4, respectively, that is, "S", "O", "N", and "O" are cut out and subjected to the synthesis for the images CL 1 to CL 5.

In such a way, the video signals corresponding to the images PGM, PVW, CLEAN, and KPVW, respectively, are generated by the synthesis processing unit 161. However, although in the case shown in FIG. 12, the key adjusting signals key 1 to key 4 are used, in the first embodiment, the key adjusting signals key 1 to key 8 are used.

The video signals corresponding to the images PGM, PVW, CLEAN, and KPVW, respectively, generated by the synthesis processing unit 161 are outputted to the sub-multiscreen split display generating unit 164. In addition, the key adjusting signals key 1 to key 8 and the synthetic key adjusting signal keyall which have been generated by the key adjusting unit 163, the wipe switching signal which has been generated by the wipe switching signal generating unit 162, and other video signals, etc. are outputted to the sub-multiscreen split display signal generating unit 164. It is noted that some video signals of these video signals are re-inputted to the switching processing block 122 as well as may be necessary.

The sub-multiscreen split display generating unit 164 selectively switches an arbitrary number and arbitrary kinds of video signals from plural video signals inputted thereto from the synthesis processing unit 161 and synthesizes the video signals thus selectively switched with one another, thereby generating the multiscreen split display signal. In the first embodiment, the sub-multiscreen split display generating unit 164 selectively switches the video signals corresponding to the images PGM, PVW, CLEAN, and KPVW, respectively, and synthesizes the video signals thus selectively switched with one another, thereby generating the sub-multiscreen split display signal s4mix. Also, the sub-multiscreen split display generating unit 164 re-inputs the sub-multiscreen split display signal s4mix thus generated to the switching processing block 122.

The predetermined pieces of mix effect processing which have been described so far are executed in the mix effect processing portions 141-1 to 141-4 independently of one another. As a result, the four kinds of sub-multiscreen split display signals s4mix1 to s4mix4 are re-inputted from the mix effect processing portions 141-1 to 141-4 to the switching processing block 122, and are inputted as the video signal group of multiscreen split display generation to the outputting block 124. In addition, the video signal PGM which has been outputted from any of the mix effect processing portions 141-1 to 141-4 to be re-inputted to the switching processing block 122 is inputted as the post-edition video signal to the outputting block 124. In this case, the main-multiscreen split display signal generating unit 202 selects an arbitrary number and arbitrary kinds of video signals from the video signal group of multiscreen split display generation, and synthesizes these video signals thus selected with one another, thereby generating the multiscreen split display signal. In the first embodiment, all of the four kinds of sub-multiscreen split display signals s4mix1 to s4mix4 are selected and synthesized with one another, thereby generating the multiscreen split display signal s16mix.

The configuration of the signal switching apparatus 101 according to the first embodiment of the signal processing apparatus has been described so far.

Next, a series of flow of processing from processing for inputting the video signals BGA and BGB to processing for generating the multiscreen split display signal s16mix to output the multiscreen split display signal s16mix thus generated to the outside of the predetermined pieces of processing which the signal switching apparatus 101 having such a configuration executes will be described in detail with reference to FIG. 13. Note that, hereinafter, such a series of processing will be referred to as multiscreen display signal generating processing.

[Multiscreen Display Signal Generating Processing]

Figure 13:
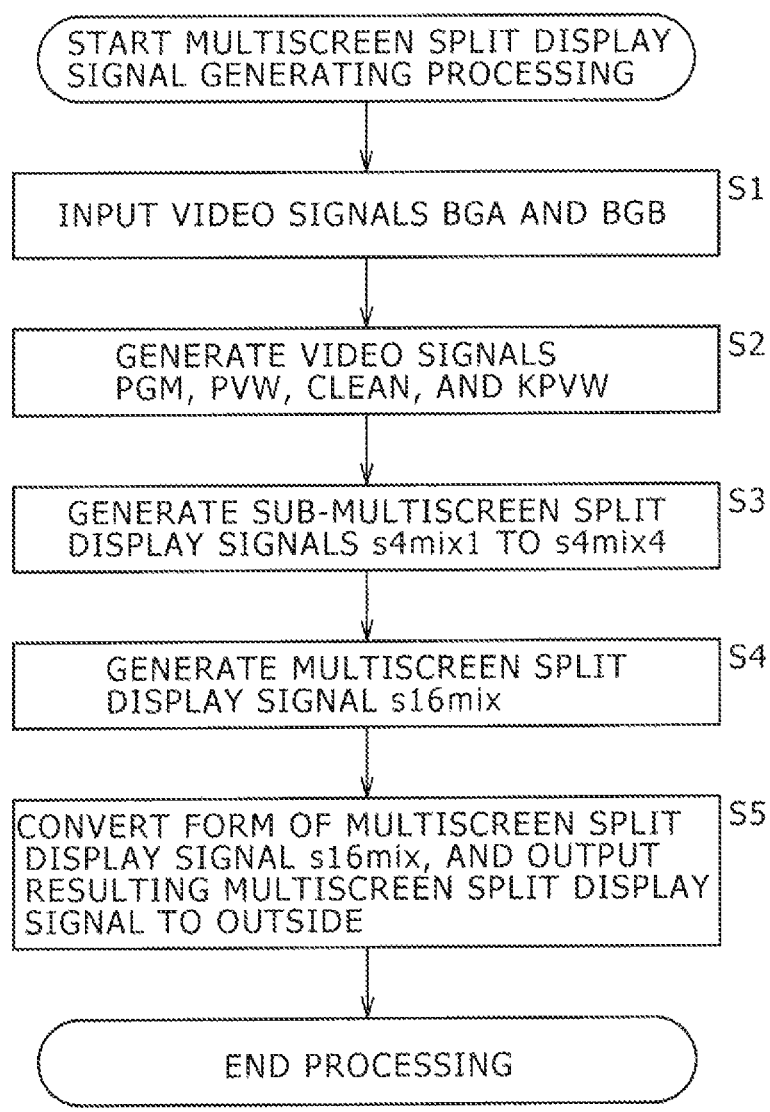
FIG. 13 is a flow chart explaining multiscreen split display signal generating processing.

FIG. 13 is a flow chart explaining an example of the multiscreen display signal generating processing.

In Step S1, the switching processing block 122 receives its inputs the video signals BGA and BGB.

The video signals BGA and BGB which have been inputted to the switching processing block 122 are inputted from the switching processing block 122 to each of the mix effect processing portions 141-1 to 141-4. After that, an operation proceeds to processing in Step S2.

In Step S2, each of the synthesis processing units 161 of the mix effect processing portions 141-1 to 141-4 generate the video signals corresponding to the images PGM, PVW, CLEAN, and KPVW, respectively.

That is to say, each of the synthesis processing units 161 of the mix effect processing portions 141-1 to 141-4 subjects the video signals BGA and BGB to the wipe switching processing, the key processing and the like, thereby generating the video signals corresponding to PGM, PVW, CLEAN, and KPVW, respectively, independently of one another. Four sets of video signals corresponding to PGM, PVW, CLEAN, and KPVW, respectively, are inputted from the synthesis processing units 161 to the sub-multiscreen split display signal generating processing units 164 in the insides of the mix effect processing portions 141-1 to 141-4, respectively. After that, the operation proceeds to processing in Step S3.

In Step S3, each of the sub-multiscreen split display signal generating processing units 164 of the mix effect processing portions 141-1 to 141-4 selects the video signals corresponding to the images PGM, PVW, CLEAN, and KPVW, respectively, and synthesizes the video signals thus selected with one another, thereby generating the sub-multiscreen split display signals s4mix1 to s4mix4.

The four kinds of sub-multiscreen split display signals s4mix1 to s4mix4 are re-inputted from each of the mix effect processing portions 141-1 to 141-4 to the switching processing block 122, and are also outputted as the video signal group of multiscreen split display generation from the switching processing block 122 to the outputting block 124. After that, the operation proceeds to processing in Step S4.

In Step S4, the main multiscreen split display signal processing unit 202 selects all of the four kinds of sub-multiscreen split display signals s4mix1 to s4mix4 from the video signal group of multiscreen split display generation, and synthesizes the four kinds of sub-multiscreen split display signals s4mix1 to s4mix4 with one another, thereby generating the multiscreen split display signal s16mix.

The multiscreen split display signal s16mix is inputted from the main multiscreen split display signal processing unit 202 to the output signal converting block 125-2.

Next, in Step S5, the output signal converting block 125-2 converts the form of the multiscreen split display signal s16mix, and outputs the resulting multiscreen split display signal s16mix to the outside. Specifically, in the first embodiment, the multiscreen split display signal s16mix is converted from the form of the differential signal into the form of the SDI signal, and is then outputted as the output signal to the display device or the like (not shown). As a result, as described above, the 16-split picture shown in FIG. 6 is displayed on the display device or the like (not shown).

In the manner as described above, the multiscreen split signal generating processing has been ended.

It is noted that in the first embodiment, a processing unit for Steps from Step S1 to Step S4 of the multiscreen split display signal generating processing is the frame contained in a period of time corresponding to the period of time from the time t1 to the time t5. However, the processing unit for Steps from Step S1 to Step S4 is by no means limited thereto, and, for example, either the frame or field is set as a unit, and so forth. Thus, the processing circuit for Steps from Step S1 to Step S4 can be arbitrarily set.

In such a way, each of the sub-multiscreen split display signal generating units 164 of the mix effect processing portions 141-1 to 141-4 previously synthesizes the video signals corresponding to the images PGM, PVW, CLEAN, and KPVW, respectively, independently of one another, thereby generating the sub-multiscreen split display signals s4mix1 to s4mix4 for the quarter screen, respectively. Also, the main multiscreen split display signal generating unit 202 selects all of the four kinds of sub-multiscreen split display signals s4mix1 to s4mix4, and synthesizes the four kinds of sub-multiscreen split display signals s4mix1 to s4mix4 with one another, thereby generating the multiscreen split display signal s16mix for the 16-split screen.

That is to say, in the related art, the multiscreen split display signals s16mix1 enabling the 16-split screen to be made was generated only in the processing in one stage in the multiscreen split display signal generating portion 62.

Specifically, the 16 kinds of aggregations of the video signals, such as the video signal PGM, the video signal PVW, the video signal CLEAN, and the video signal KPVW each having a size for one screen were inputted as the video signal group for the multiscreen split display generation to one multiscreen split display signal generating portion 62. For this reason, the 16 kinds of video signals were synthesized with one another in one multiscreen split display signal generating portion 62, thereby generating the multiscreen split display signal s16mix.

On the other hand, in the first embodiment, the multiscreen split display signal s16mix enabling the 16-split pictures to be made is used not only in the main multiscreen split display signal generating unit 202, but also in plural sub-multiscreen split display signal generating units 164 to be generated in the processing in the two stages.

Specifically, in the processing in the first stage, the 16 kinds of aggregations of the video signals, such as the video signal PGM, the video signal PVW, the video signal CLEAN, and the video signal KPVW each having a size for one screen are inputted to plural sub-multiscreen split display generating units 164 with the four kinds of video signals such as the video signal PGM, the video signal PVW, the video signal CLEAN, and the video signal KPVW as a processing unit. Also, each of the plural sub-multiscreen split display generating units 164 synthesizes the four kinds of video signals as the processing unit with one another. As a result, the sub-multiscreen split display signals s4mix1 to s4mix4 each having a size of the quarter split screen which is four times less than that of one screen are generated in the processing in the first stage. In the processing in the second stage, the four kinds of sub-multiscreen split display signals s4mix1 to s4mix4 are inputted to the main multiscreen split display signal generating unit 202. Also, the plural main multiscreen split display signal generating units 202 synthesizes the four kinds of sub-multiscreen split display signals s4mix1 to s4mix4 into the video signal having the size for one screen, thereby generating the multiscreen split display signal s16mix in which the 16-split screens each having the size which is 16 times less than that of one screen are synthesized in size into one screen.

Comparing the number of internal signal lines in the existing switching apparatus 1 with the number of internal signal lines in the switching apparatus 101 of the first embodiment, for the purpose of generating the multiscreen split display signal s16mix for the 16-split screens, the 16 internal signal lines are necessary in the related art, whereas it is only necessary to provide the four internal signal lines in the first embodiment.

For this reason, for the purpose of generating the multiscreen split display signal s16mix for the 16-split screens, in the related art, the constituent elements of the signal switching apparatus 1 needed to be realized in the form of the circuit having 16 inputs/outputs. As a result, since the circuit scale was increased, it was difficult to realize the multiscreen split display of the 16-split. On the other hand, in the first embodiment, since the constituent elements of the signal switching apparatus 101 can be realized in the form of the circuit having the four inputs/outputs, it becomes possible to suppress the increase in circuit scale, and it becomes also possible to readily realize the multiscreen split display of the 16-split.

In addition, the frame memory 142, the special effect processing portion 143, and the three-dimensional effect processing portion 144 as the constituent elements for subjecting the intra-apparatus signals inputted thereto from the switching processing block 122 to the various kinds of signal processing are provided with the sub-multiscreen split display signal generating units 171, 181, and 191, respectively. As a result, either the signals or the intermediate generation signals which have been generated in the frame memory 142, the special effect processing portion 143, and the three-dimensional effect processing portion 144, respectively, are not outputted with the form thereof being held as they are, but are outputted in the form of the sub-multiscreen split display signal into which plural signals are synthesized. Therefore, it is possible to reduce the number of signal lines necessary for the output. As a result, it becomes possible to suppress the increase in circuit scale of the signal switching apparatus 101.

In addition, in the signal switching apparatus 101 of the first embodiment, the sub-multiscreen split display signal generating units are disposed either within the constituent elements for executing the various kinds of signal processing, that is, within the mix effect processing portion 141, the frame memory 142, the special effect processing portion 143, and the three-dimensional effect processing portion 144, respectively, or outside the mix effect processing portion 141, the frame memory 142, the special effect processing portion 143, and the three-dimensional effect processing portion 144, respectively. As a result, it becomes possible to display the images corresponding to the signals generated in the constituent elements for executing the various kinds of signal processing, and the intermediate generation signals generated in the middle of execution of the various kinds of signal processing.

In addition, since the sub-multiscreen split display signal s4mix into which plural signals are synthesized can be treated as one signal, the control made by the control block 127 becomes easy.

2. Second Embodiment

Signal Switching Apparatus

The sub-multiscreen split display generating unit 164 of the first embodiment selects the video signals PGM, PVW, CLEAN, and KPVW, generated by the synthesis processing unit 161, of the various kinds of video signals inputted thereto from the switching processing block 122, and synthesizes the video signals PGM, PVW, CLEAN, and KPVW thus selected with one another. That is to say, the sub-multiscreen split display signal s4mix is generated with which the images PGM, PVW, CLEAN, and KPVW are displayed on the left, right, top, and bottom of the screen in the quarter split display manner.

However, the video signals which the sub-multiscreen split display generating unit 164 selects and synthesizes with one another are especially by no means limited to the case of the first embodiment. Then, in a second embodiment, the key adjusting signals key 1 to key 8, and the synthetic key adjusting signal keyall which have been all generated by the key adjusting unit 163 are selected and synthesized with one another, thereby generating a sub-multiscreen split display signal having a structure shown in FIG. 14 which will be described later. It should be noted that in order to clearly distinguish the sub-multiscreen split display signal generated in the second embodiment from the sub-multiscreen split display signal s4mix generated in the first embodiment, the sub-multiscreen split display signal generated in the second embodiment will be hereinafter referred to as "the sub-multiscreen split display signal sKmin."

Hereinafter, details of the sub-multiscreen split display signal sKmin will be described on the assumption that the configuration of the signal switching apparatus of the second embodiment is comparable to that of the signal switching apparatus 101 of the first embodiment.

[Sub-Multiscreen Split Display Signal sKmix]

Figure 14:
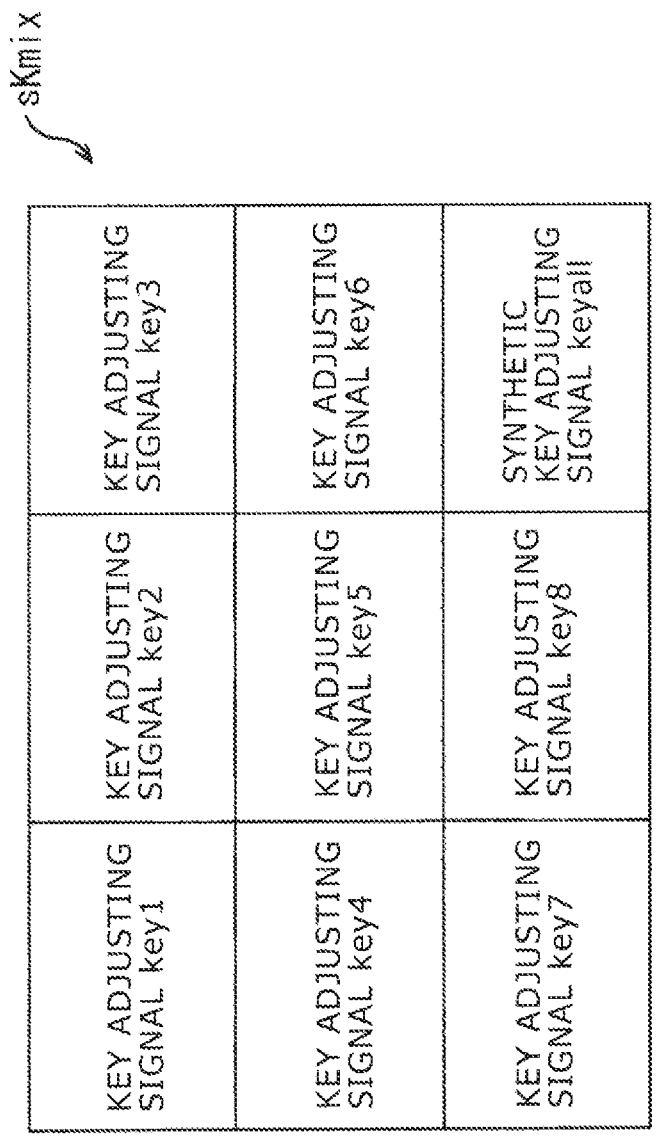
FIG. 14 is a diagram showing another example of the sub-multiscreen split display signal.

FIG. 14 is a diagram showing the sub-multiscreen split display signal sKmix which is generated by the sub-multiscreen split display generating unit 164 in the second embodiment.

In the second embodiment, the sub-multiscreen split display generating unit 164 synthesizes the key adjusting signals key 1 to key 8, and the synthetic key adjusting signal keyall which have been all generated by the key adjusting unit 163 with one another, thereby generating the sub-multiscreen split display signal sKmix.

Therefore, the editor comes to be able to confirm an edition work while he/she confirms the objects synthesized into the image of the program, that is, the objects corresponding to the key adjusting signals, respectively, by viewing the image corresponding to the sub-multiscreen split display signal sKmix.

The sub-multiscreen split display signal generating units 164 of the mix effect processing portions 141-1 to 141-4 generate and output the sub-multiscreen split display signals sKmix each corresponding to nine-split screens independently of one another. Then, the sub-multiscreen split display signals sKmix which are outputted from the mix effect processing portions 141-1 to 141-4, respectively, will be hereinafter referred to as "the sub-multiscreen split display signals sKmix1 to sKmix4," respectively.

The four kinds of sub-multiscreen split display signals sKmix1 to sKmix4 in total are outputted from the signal processing block 123 including the mix effect processing portions 141-1 to 141-4 to be re-inputted to the switching processing block 122.

For this reason, in the signal switching apparatus of the second embodiment, an aggregation of the four kinds of sub-multiscreen split display signals sKmix1 to sKmix4 is outputted as a video signal group for multiscreen split display generation from the switching processing block 122 to be inputted to the outputting block 124.

The main multiscreen split display signal generating unit 202 of the outputting block 124 selects and synthesizes all of the video signal group for multiscreen split display generation, that is, all of the four kinds of sub-multiscreen split display signals sKmix1 to sKmix4 with one another. As a result, although not illustrated, a multiscreen split display signal for 36-split images is generated and is then outputted to the output signal converting block 125-2.

The output signal converting block 125-2 converts the multiscreen split display signal outputted thereto from the main multiscreen split display signal generating unit 202 from a form of the intra-apparatus signal into a form of the intra-apparatus signal suitable for the display device or the like (not shown). Specifically, in the second embodiment, the multiscreen split display signal is converted from the form of the differential signal into the form of the SDI signal, and is then outputted as the output signal to the external display device or the like (riot shown). Then, although not illustrated, 36-split pictures in which 36 kinds of objects corresponding to the various kinds of key adjusting signals and the like, respectively, are displayed in the split screen manner are displayed on the display device or the like (not shown).

3. Third Embodiment

Signal Switching Apparatus

In each of the first and second embodiments of the signal processing apparatus of the present disclosure, the main multiscreen split display signal generating unit 202 generates the multiscreen split display signals with the aggregation of the four kinds of sub-multiscreen split display signals generated in the mix effect processing portions 141-1 to 141-4, respectively, as the video signal group of multiscreen split display generation.

However, the video signal group of multiscreen split display generation needs not to be especially the sub-multiscreen split display signals generated in the mix effect processing portions 141-1 to 141-4, respectively. In the third embodiment of the signal processing apparatus of the present disclosure, an aggregation of the sub-multiscreen split display signals generated by the three-dimensional effect processing portion 144 is adopted as the video signal group of multiscreen split display generation.

Hereinafter, details of a sub-multiscreen split display signal in the third embodiment, and a multiscreen split display signal generated from the sub-multiscreen split display signal will be described on the assumption that a configuration of the signal switching apparatus of the third embodiment is comparable to that of the signal switching apparatus 101 of the first embodiment.

[Multiscreen Split Display Signal s3Dmix]

FIG. 15 is a diagram showing a multiscreen split display signal generated from the signal switching apparatus of the third embodiment.

As shown in FIG. 15, the multiscreen split display signal s3Dmix is a video signal obtained as a result of synthesizing four kinds of sub-multiscreen split display signals sL4mix, sR4mix, sLKmix, and sRKmix with one another.

For example, it is supposed that the video signals PGM, PVW, CLEAN, and KPVW are re-inputted from the mix effect processing portion 141-1 to the switching processing block 122, and are further inputted from the switching processing block 122 to the three-dimensional effect processing portion 144.

In this case, the three-dimensional effect processing portion 144 generates a video signal PGM for a left eye and a video signal PGM for a right eye, a video signal PVW for the left eye and PVW for the right eye, a video signal CLEAN for the left eye and a video signal CLEAN for the right eye, and a video signal KPVW for the left eye and a video signal KPVW for the right eye.

Also, the sub-multiscreen split display signal generating unit 191 of the three-dimensional effect processing portion 144 selects the video signal PGM for the left eye, the video signal PVW for the left eye, the video signal CLEAN for the left eye, and the video signal KPVW for the left eye, and synthesizes the video signal PGM for the left eye, the video signal PVW for the left eye, the video signal CLEAN for the left eye, and the video signal KPVW for the left eye thus selected with one another, thereby generating the sub-multiscreen split display signal sL4mix for the left eye. In addition, the sub-multiscreen split display signal generating unit 191 selects the video signal PGM for the right eye, the video signal PVW for the right eye, the video signal CLEAN for the right eye, and the video signal KPVW for the right eye, and synthesizes the video signal PGM for the right eye, the video signal PVW for the right eye, the video signal CLEAN for the right eye, and the video signal KPVW for the right eye thus selected with one another, thereby generating the sub-multiscreen split display signal sR4mix for the right eye.

In other words, the video signals equivalent to the video signals obtained when the sub-multiscreen split display signal s4mix1 generated by the mix effect processing portion 141-1 has been subjected to the three-dimensional effect processing are a set of sub-multiscreen split display signal sL4mix for the left eye and sub-multiscreen split display signal sR4mix for the right eye. Therefore, the video signal inputted from the switching processing block 122 to the three-dimensional effect processing portion 144 may be the sub-multiscreen split display signal s4mix generated by the mix effect processing portion 141.

In addition, for example, it is supported that the video signals of the key adjusting signals key 1 to key 4 are re-inputted from the mix effect processing portion 141-1 to the switching processing block 122, and are further inputted from the switching processing block 122 to the three-dimensional effect processing portion 144.

In this case, the three-dimensional effect processing portion 144 generates video signals, that is, a key adjusting signal key 1 for the left eye and a key adjusting signal key 1 for the right eye, a key adjusting signal key 2 for the left eye and a key adjusting signal key 2 for the right eye, a key adjusting signal key 3 for the left eye and a key adjusting signal key 3 for the right eye, and a key adjusting signal key 4 for the left eye and a key adjusting signal key 4 for the right eye.

Also, the sub-multiscreen split display signal generating unit 191 of the three-dimensional effect processing portion 144 selects the key adjusting signal key 1 for the left eye, the key adjusting signal key 2 for the left eye, the key adjusting signal key 3 for the left eye, and the key adjusting signal key 4 for the left eye, and synthesizes the key adjusting signal key 1 for the left eye, the key adjusting signal key 2 for the left eye, the key adjusting signal key 3 for the left eye, and the key adjusting signal key 4 for the left eye thus selected with one another, thereby generating the sub-multiscreen split display signal sLKmix for the left eye. In addition, the sub-multiscreen split display signal generating unit 191 selects the key adjusting signal key 1 for the right eye, the key adjusting signal key 2 for the right eye, the key adjusting signal key 3 for the right eye, and the key adjusting signal key 4 for the right eye, and synthesizes the key adjusting signal key 1 for the right eye, the key adjusting signal key 2 for the right eye, the key adjusting signal key 3 for the right eye, and the key adjusting signal key 4 for the right eye thus selected with one another, thereby generating the sub-multiscreen split display signal sRKmix for the right eye.

The sub-multiscreen split display signal sL4mix for the left eye and the sub-multiscreen split display signal sR4mix for the right eye, and the sub-multiscreen split display signal sLKmix for the left eye and the sub-multiscreen split display signal sRKmix for the right eye which have been generated in such a way by the three-dimensional effect processing portion 144 are re-inputted to the switching processing block 122.

For this reason, in the signal switching apparatus of the third embodiment, an aggregation of the sub-multiscreen split display signal sL4mix for the left eye and the sub-multiscreen split display signal sR4mix for the right eye, and the sub-multiscreen split display signal sLKmix for the left eye and the sub-multiscreen split display signal sRKmix for the right eye becomes a video signal group for multiscreen split display generation. Such a video signal group for multiscreen split display generation is outputted from the switching processing block 122 to be inputted to the outputting block 124.

The main multiscreen split display signal generating unit 202 of the outputting block 124 selects and synthesizes all of the video signal group for multiscreen split display generation with one another. That is to say, all of the sub-multiscreen split display signal sLmix for the left eye and the sub-multiscreen split display signal sRmix for the right eye, and the sub-multiscreen split display signal sLKmix for the left eye and the sub-multiscreen split display signal sRKmix for the right eye are selected to be synthesized with one another. As a result, the multiscreen split display signal 3Dmix shown in FIG. 15 is generated to be outputted to the output signal converting block 125-2.

The output signal converting block 125-2 converts the multiscreen split display signal s3Dmix outputted thereto from the main multiscreen split display signal generating unit 202 from a form of the intra-apparatus signal into a form of the intra-apparatus signal suitable for the display device or the like (not shown). Specifically, in the third embodiment, the multiscreen split display signal is converted from the form of the differential signal into the form of the SDI signal, and is then outputted as the output signal to the display device or the like (not shown). As a result, as shown in FIG. 15, in the left half of the screen of the display device or the like (not shown), the eight kinds of various images for the left eye are displayed on the respective sub-screens in the split screen manner. On the other hand, in the right half of the screen of the display device or the like (not shown), the eight kinds of various images for the right eye are displayed on the respective sub-screens in the split screen manner.

It should be noted that in the first to third embodiments, it is enough for the video signals becoming the base for the selection of the sub-multiscreen split display signals to be plural video signals inputted to the respective constituent elements in which the sub-multiscreen split display signal generating units are disposed, respectively, and the intermediate generation signals generated during execution of the predetermined pieces of signal processing by the respective constituent elements. In a word, the video signals given in the first to third embodiments are merely the exemplifications.

It is noted that although in each of the first to third embodiments described above, plural sub-multiscreen split display signal generating units are provided for one signal switching apparatus, the present disclosure is especially by no means limited thereto. For example, one sub-multiscreen split display signal generating unit may be provided for one signal switching apparatus. In addition, although in each of the first to third embodiments described above, plural mix effect processing portions are provided for one signal switching apparatus, one mix effect processing portion may be provided for one signal switching apparatus.

The present disclosure can be applied to the signal processing apparatus including the mix effect processing portion(s).

4. Embodiment

Program

A program according to an embodiment of the present disclosure causing a computer to execute the control processing includes the steps of: inputting the plural video signals BGA, BGB, etc.; subjecting the plural video signals BGA, BGB, etc. thus inputted to the signal processing; selecting the P (P: integral number of 2 or more) kinds of video signals PGM, PVW, CLEAN, KPVW, etc. from the plural video signals BGA, BGB, etc. subjected to the signal processing, and the intermediate generation signals as the one or more video signals generated while the plural video signals BGA, BGB, etc. are subjected to the signal processing, and synthesizing the P kinds of video signals PGM, PVW, CLEAN, KPVW, etc. thus selected, thereby generating the one or more sub-multiscreen split display signals s4mix1 to s4mix4; and selecting the Q (Q: integral number of 1 or more) kinds of sub-multiscreen split display signals s4mix1 to s4mix4 from the one or more sub-multiscreen split display signals s4mix1 to s4mix4 generated, and synthesizing the Q kinds of sub-multiscreen split display signals s4mix1 to s4mix4 thus selected, thereby generating a multiscreen split display signal s16mix.

The present disclosure contains subject matter related to that disclosed in Japanese Priority Patent Application JP 2010-190385 filed in the Japan Patent Office on Aug. 27, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A signal processing apparatus comprising:
an inputting section configured to input plural video signals;
one or more signal processing sections configured to subject the plural video signals inputted to said inputting section to signal processing by adding effects to said plural video signals and mixing the plural video signals to produce at least wipe switching or key switching of said plural video signals and previewing of the image next following said wipe switching;
one or more sub-multiscreen split display signal generating sections included as constituent elements of respective ones of said signal processing sections and configured to select P (P: integral number of 2 or more) kinds of video signals from (a) the video signals produced by said signal processing section, and (b) intermediate generation signals generated while said signal processing section subjects the plural video signals to the signal processing, and synthesize the P kinds of video signals thus selected, thereby generating one or more sub-multiscreen split display signals for display as respective sub-screens in a split screen manner, each sub-multiscreen split display generating section operating independently of other sub-multiscreen split display generating sections; and a multiscreen split display signal generating section configured to select Q (Q: integral number of 1 or more) kinds of sub-multiscreen split display signals from the generated one or more sub-multiscreen split display signals for displaying PxQ sub-screens in the split screen manner on a single screen.

2. The signal processing apparatus according to claim 1, wherein:
the intermediate generation signals are generated while said one or more processing section execute the mix effect processing, and said one or more sub-multiscreen split display signal generating section synthesizes the P kinds of video signals thus selected with one another, thereby generating the sub-multiscreen split display signal.

3. The signal processing apparatus according to claim 1, wherein:
said signal processing section includes
a frame memory configured to store therein at least a part of the plural video signals inputted to said inputting section for the signal processing, the plural video signals subjected to the signal processing and outputted by said signal processing section, the intermediate generation signals, and the sub-multiscreen split display signal;
said sub-multiscreen split display signal generating section is provided as a constituent element of said frame memory; and
said sub-multiscreen split display signal generating section selects P kinds of video signals from the video signals stored by said frame memory and synthesizes the P kinds of video signals thus selected with one another, thereby generating the sub-multiscreen split display signal.

4. The signal processing apparatus according to claim 1, wherein:
said signal processing section
executes signal processing for at least a part of the plural video signals inputted to said inputting section, the plural video signals subjected to the signal processing and outputted by said signal processing section, the intermediate generation signals, and the sub-multiscreen split display signal.

5. The signal processing apparatus according to claim 1, wherein
said signal processing section includes
a three-dimensional effect processing section configured to convert at least a part of the plural video signals inputted to said inputting section, the plural video signals subjected to the signal processing and outputted by said signal processing section, the intermediate generation signals, and the sub-multiscreen split display signal into a video signal(s) for display of a three-dimensional image, thereby executing three-dimensional effect processing;
said sub-multiscreen split display signal generating section is provided as a constituent element of said three-dimensional effect processing section; and
said sub-multiscreen split display signal generating section selects P kinds of video signals from the video signals subjected to the three-dimensional effect processing by said three-dimensional effect processing section, and the intermediate generation signals as one or more video signals generated while said three-dimensional effect processing section executes the three-dimensional effect processing, and synthesizes the P kinds of video signals thus selected with one another, thereby generating the sub-multiscreen split display signal.

6. A signal processing method comprising:
inputting plural video signals;
subjecting the plural video signals inputted in the inputting processing to signal processing by adding effects to said plural video signals and mixing the plural video signals to produce at least wipe switching or key switching of said plural video signals and previewing of the image next following said wipe switching;
selecting P (P: integral number of 2 or more) kinds of video signals from (a) the video signals produced by the signal processing, and (b) intermediate generation signals generated while the plural video signals are subjected to the signal processing, and synthesizing the P kinds of video signals thus selected, thereby generating one or more sub-multiscreen split display signals, for display as respective sub-screens in a split screen manner, each sub-multiscreen split display signal being generated independently of other sub-multiscreen split display signals; and
selecting Q (Q: integral number of 1 or more) kinds of sub-multiscreen split display signals from the generated one or more sub-multiscreen split display signals for displaying PxQ sub-screens in the split screen manner on a single screen.

7. A non-transitory computer-readable medium storing a program to cause a computer to execute control processing comprising:
inputting plural video signals;
subjecting the plural video signals thus inputted to signal processing by adding effects to said plural video signals and mixing the plural video signals to produce at least wipe switching or key switching of said plural video signals and previewing of the image next following said wipe switching;
selecting P (P: integral number of 2 or more) kinds of video signals from (a) the video signals produced by the signal processing, and (b) intermediate generation signals generated while the plural video signals are subjected to the signal processing, and synthesizing the P kinds of video signals thus selected, thereby generating one or more sub-multiscreen split display signals, for display as respective sub-screens in a split screen manner, each sub-multiscreen split display signal being generated independently of other sub-multiscreen split display signals; and
selecting Q (Q: integral number of 1 or more) kinds of sub-multiscreen split display signals from the generated one or more sub-multiscreen split display signals for displaying PxQ sub-screens in the split screen manner on a single screen.

* * * * *